United States Patent
Sherman

(10) Patent No.: US 11,886,391 B2
(45) Date of Patent: Jan. 30, 2024

(54) EFFICIENT FILE-DELIVERY TECHNIQUES

(71) Applicant: Valve Corporation, Bellevue, WA (US)

(72) Inventor: Taylor Karsten Sherman, Seattle, WA (US)

(73) Assignee: VALVE CORPORATION, Bellevue, WA (US)

( * ) Notice: Subject to any disclaimer, the term of this patent is extended or adjusted under 35 U.S.C. 154(b) by 394 days.

(21) Appl. No.: 16/874,234

(22) Filed: May 14, 2020

(65) Prior Publication Data

US 2021/0357370 A1  Nov. 18, 2021

(51) Int. Cl.
| | |
|---|---|
| *G06F 8/65* | (2018.01) |
| *G06F 16/18* | (2019.01) |
| *G06F 8/658* | (2018.01) |
| *H04L 69/324* | (2022.01) |

(52) U.S. Cl.
CPC ............ *G06F 16/1873* (2019.01); *G06F 8/65* (2013.01); *G06F 8/658* (2018.02); *H04L 69/324* (2013.01)

(58) Field of Classification Search
CPC ......... G06F 8/65; G06F 8/658; G06F 16/1873
USPC ........................................................ 717/170
See application file for complete search history.

(56) References Cited

U.S. PATENT DOCUMENTS

| | | | |
|---|---|---|---|
| 5,822,511 A | 10/1998 | Kashyap et al. | |
| 6,216,175 B1 | 4/2001 | Sliger | |
| 6,493,721 B1 | 12/2002 | Getchius et al. | |
| 7,320,009 B1 | 1/2008 | Srivastava et al. | |
| 7,640,363 B2 | 12/2009 | Teodosiu et al. | |
| 7,664,819 B2 | 2/2010 | Murphy et al. | |
| 8,996,659 B2 | 3/2015 | Werth et al. | |
| 2003/0182414 A1* | 9/2003 | O'Neill et al. | G06F 8/65 717/171 |
| 2003/0212712 A1 | 11/2003 | Gu et al. | |
| 2007/0192474 A1 | 8/2007 | Decasper et al. | |
| 2007/0226320 A1 | 9/2007 | Hager et al. | |
| 2010/0191774 A1 | 7/2010 | Mason, Jr. et al. | |
| 2011/0145313 A1 | 6/2011 | Narayanan et al. | |
| 2013/0013874 A1 | 1/2013 | Graefe et al. | |
| 2013/0304711 A1 | 11/2013 | Resch | |
| 2014/0101096 A1 | 4/2014 | Pfeifle et al. | |
| 2014/0250066 A1* | 9/2014 | Calkowski et al. | G06F 8/65 707/624 |
| 2015/0286668 A1 | 10/2015 | Legler | |
| 2016/0132576 A1 | 5/2016 | Qi et al. | |
| 2016/0147457 A1 | 5/2016 | Legler et al. | |
| 2016/0147804 A1 | 5/2016 | Wein et al. | |

(Continued)

OTHER PUBLICATIONS

Office Action for U.S. Appl. No. 16/245,049, dated Sep. 25, 2020, Sherman, "Delivery of Digital Information to a Remote Device", 16 Pages.

(Continued)

*Primary Examiner* — Wei Y Zhen
*Assistant Examiner* — Mohammed N Huda
(74) *Attorney, Agent, or Firm* — Lee & Hayes P.C.

(57) ABSTRACT

Described herein are, among other things, techniques, devices, and systems for identifying portions of a new version of an application that are new to the new version and portions of the new version that are common to the new version and a previous version of the application, such that a client computing device may efficiently update from the previous version to the new version.

19 Claims, 16 Drawing Sheets

(56) References Cited

U.S. PATENT DOCUMENTS

| | | |
|---|---|---|
| 2016/0212448 A1 | 7/2016 | Wang et al. |
| 2017/0046234 A1 | 2/2017 | Yang et al. |
| 2017/0060480 A1 | 3/2017 | Gray et al. |
| 2017/0147225 A1 | 5/2017 | Geissinger et al. |
| 2017/0147324 A1* | 5/2017 | Weber et al. ............ G06F 8/65 |
| 2018/0307478 A1 | 10/2018 | Norris |
| 2019/0147067 A1 | 5/2019 | Rigor |
| 2020/0026524 A1 | 1/2020 | Roland et al. |
| 2020/0244731 A1 | 7/2020 | Otten et al. |
| 2020/0349126 A1* | 11/2020 | Landman ............ G06F 16/1873 |
| 2021/0329071 A1 | 10/2021 | Otten et al. |

OTHER PUBLICATIONS

Office Action for U.S. Appl. No. 16/262,431, dated Nov. 13, 2020, Otten, "Techniques for Updating Files", 33 Pages.

PCT Search Report & Written Opinion for PCT App No. PCT/US21/70545, dated Aug. 31, 2021, 12 pages.

Charles Bloom "Sep. 23, 2012—Patches and Deltas", retrived on Jan. 25, 2019 at <<https://cbloomrants.blogspot.com/2012/09/09-23-12-patches-and-deltas.html>>, 8 pages.

The PCT Search Report and Written Opinion dated Mar. 25, 2020 for PCT Application No. PCT/US19/68488, 10 pages.

Extended European Search Report dated May 20, 2022 for European Patent Application No. 19912771.3, 12 pages.

Office Action for U.S. Appl. 17/396,348, dated Nov. 17, 2022, Sherman,"Delivery of Digital Information to a Remote Device", 13 Pages.

* cited by examiner

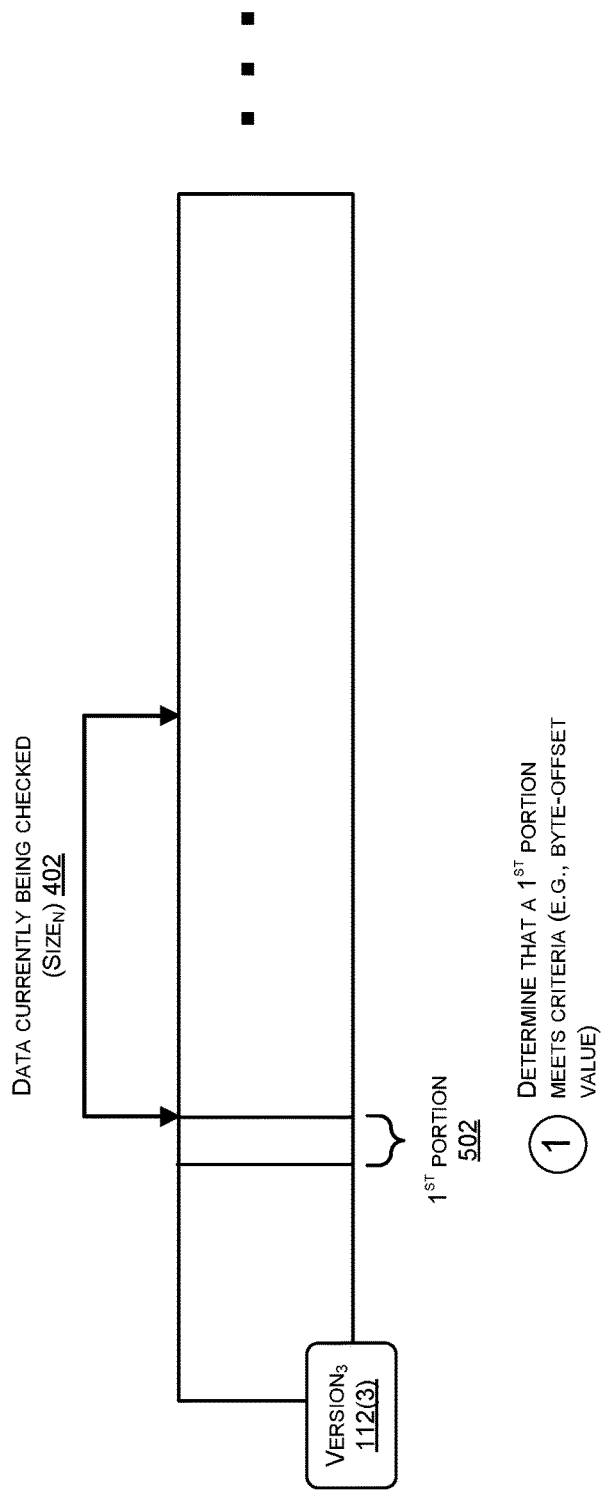

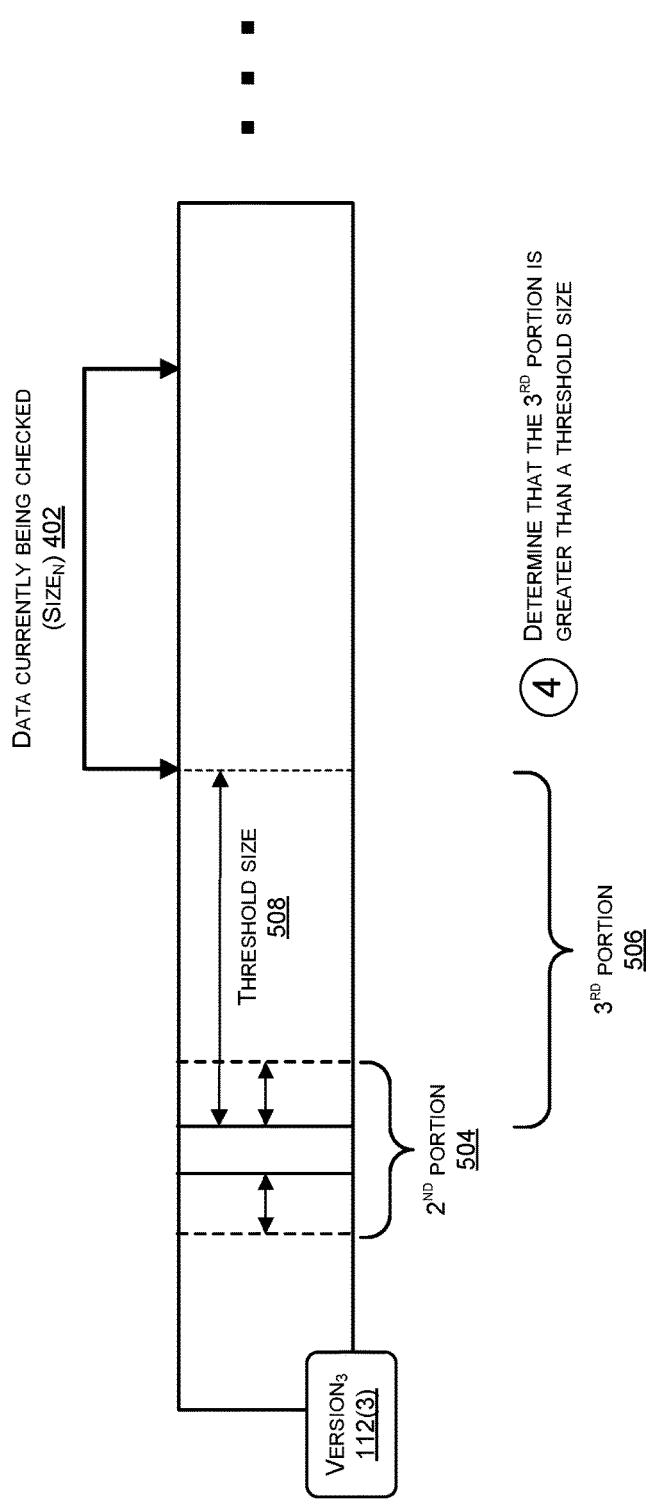

EFFICIENT FILE-DELIVERY TECHNIQUES

BACKGROUND

As the consumption of content items on electronic devices has continued to proliferate, so has the amount of available content items. For example, the number of songs, movies, television shows, and games available for streaming or download has increased substantially in the recent past. Some of these content items, such as video games and other applications, are periodically updated by their respective developers. Users of these games and other applications often want to download the most up-to-date version of a particular game or application, although doing so can require significant time and network bandwidth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates an example scenario where a portion-creation component of the remote system of FIG. 1 creates N-byte-sized portions of a first version of a file, while a portion-identification component of the remote system generates data associated with these respective portions for identifying the portions. The data may comprise check values (e.g., cyclic redundancy check (CRC) values), hash values (e.g., SHA-1 values), and/or the like.

FIGS. 5A-H collectively illustrate a scenario of creating a portion of clean data, between two sections of dirty data, and data that identifies the clean data. This portion of clean data and its identifying data may then be stored. The identifying data may later be used to identify the same section of clean data in subsequent versions of the file.

DETAILED DESCRIPTION

Figure 1:
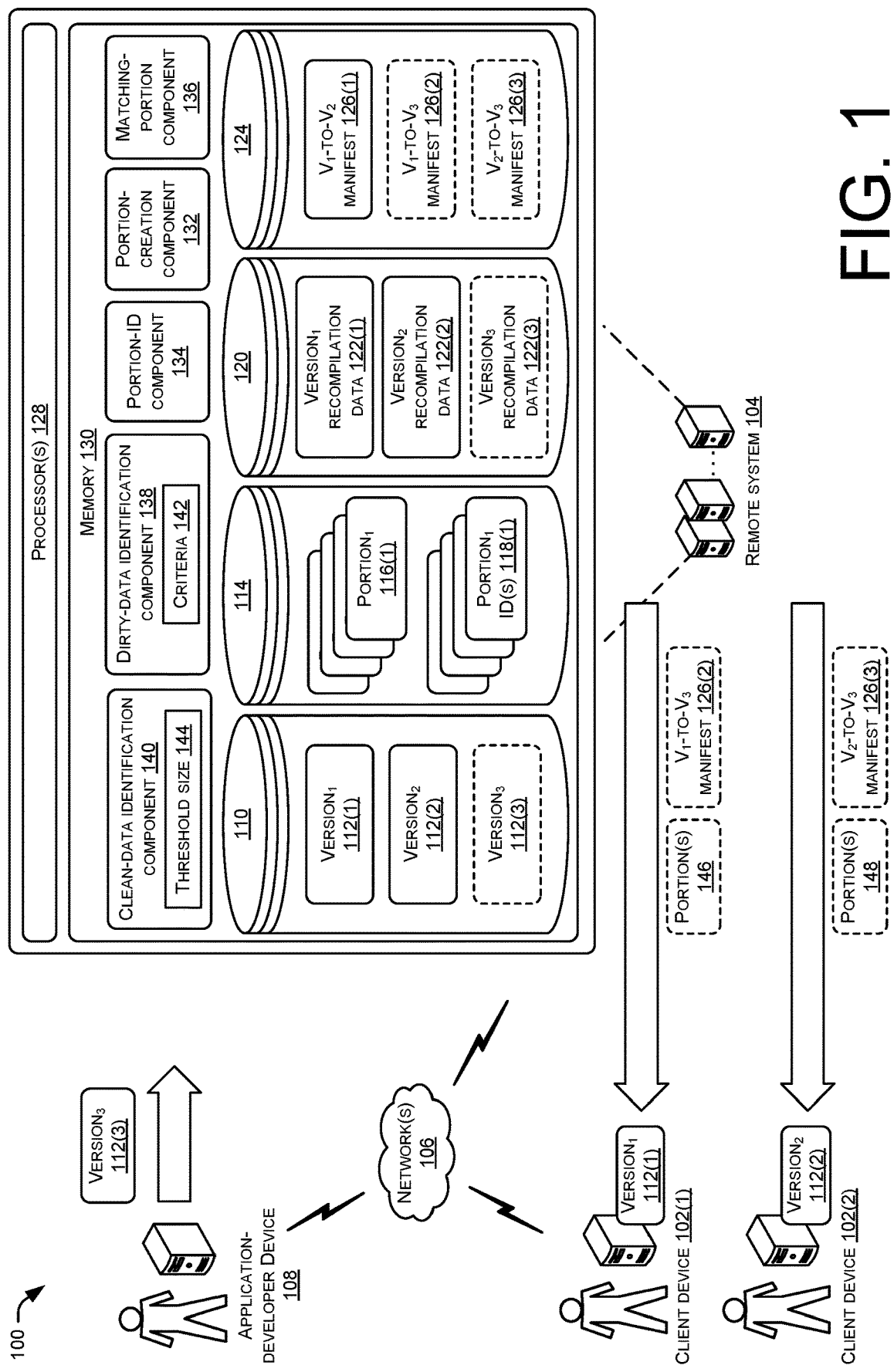
FIG. 1 is a diagram illustrating an example environment that includes multiple client computing devices, operated by respective users, coupled to a remote computing system configured to provide games and other content items to the client computing devices. In some instances, the remote system receives a new version of a game or other application from a developer and, in response, identifies which portions of the new version are new and which portions were present in previous versions, as well as the location of each portion in the new version. The remote system may then update the game or application on the client computing devices in a manner that is more efficient than simply sending the entire new version to these devices.

Described herein are, among other things, techniques, devices, and systems for identifying portions of a new version of an application that are new to the new version and portions of the new version that are common to the new version and a previous version of the application, such that a client computing device may efficiently update from the previous version to the new version.

As noted above, the use of client computing devices continues to proliferate, as does the consumption of content items, such as video games and other applications. In some instances, developers of applications, such as games, continue to add and change applications, resulting in new versions of the applications. For example, a developer of a game may release a first version of an application and may thereafter add content to the game and release a second version, a third version, and so forth.

Often, consumers of the game may wish to receive the latest version of the game and, thus, may send an update request for the latest version to a remote system that hosts the application. However, rather than send the entire new version of the application to a client computing device that requests the new version, the remote system may instead send only the new portions of the new version of the application, as well as a manifest file containing instructions for re-creating the new version of the application using the previous version of the application that the client computing device currently executes and the new portions of the application. These instructions may instruct the client computing device to delete some files, move some files, duplicate some files, and/or the like. As the reader will appreciate, sending the new portions of the new version of the application and the manifest—rather than the entire new version of the application—results in a more efficient delivery of content to the client computing device. That is, the size of the package delivered to the client computing device may be significantly smaller than if the remote system sends the entire new version of the application, thus lessening the network bandwidth and time needed for the client computing device to receive the package. Further, given that the recompilation time may be relatively small, the client computing device may run—and the end user may enjoy—the new version of the application more quickly than if the remote system sends the entire new version of the application to the client computing device.

In order to send the new portions and the manifest file, however, the remote system may first analyze the new version of the application relative to a prior version of the application to identify the new portions. For example, the remote system may analyze the new version relative to the prior version to identify portions of the new version that match portions within the prior version. The remote system may deem those portions of the new version that have not been found to have a match within the prior version as new portions relative to the new version of the application. In addition, this analysis by the remote system may result in the remote system identifying the respective locations, in the new version, of the portions that are common in both the prior and the new version of the application. In addition to storing the content associated with the new portions, the remote system may also store this recompilation information. For example, if the remote system identifies that a portion "A" is present in the new version at location "X" and in the prior version at location "Y", the remote system may store, as recompilation information, an indication that portion "A" resides at location "X" within the new version of the application.

In order to make this comparison, in some instances the remote system makes use of one or more techniques for generating data that uniquely or relatively uniquely identifies respective portions of a file. For example, the remote system may generate cyclic redundancy check (CRC) values of each portion of a version of an application, a hash value of each portion of the version of the application, and/or the like for uniquely identifying the portions. For example, the remote system may generate this data for each of multiple portions of a first version of an application and, upon receiving a second, updated version of the application, may analyze the second version to determine whether these values are present. If so, the remote system may determine that the corresponding portion is not new to the second version.

To provide an example, envision that an application developer provides (e.g., uploads) a first version of an application to the remote system. In response to receiving this first version, the remote system may begin by creating portions (or "chunks") of the first version of the application and data that identifies these portions. For example, the remote system may, starting from a beginning of the first version of the file, generate portions of "N" size (e.g., where N is a predefined number of bytes). For example, the remote system may generate a first portion from the first "N" bytes of the first version of the file, a second portion from the second "N" bytes of the first version of the file, and so forth.

In some instances, the remote system may create one-Megabyte (1-MB) size portions, while in other instances the remote system may utilize any size of portions.

In addition to generating the respective portions of the first version of the application, the remote system may generate data that uniquely or relatively uniquely identifies these portions. For example, the remote system may generate a CRC value of the first portion, a CRC value of the second portion, and so forth. The remote system may then store these CRC values in association with their respective portions. In addition, the remote system may generate a hash value of each respective portion, such as a hash value of the first portion, a hash value of the second portion, and so forth. These hash values may also be stored in association with their respective portions.

Thereafter, when client computing devices requests to receive (e.g., download) the first version of the application, the remote system may send, to the devices, the entire version. That is, the remote system may send each portion of the first version of the application to the client computing devices.

Thereafter, however, the application developer may generate a second version of the application, which may have commonality between the first version. For example, the second version of the application may include many of the same portions of data as the first version, may but may also include additional data, may remove some data from the first version, and/or the like.

Upon receiving the second version of the application, the remote system may attempt to determine the correspondence between the first and second versions. For example, the remote system may attempt to identify which portions of the second version are also present in the first version, and the location of these common portions. The remaining data in the second version may comprise new data and may be stored as new portions, as described below. Thus, when client computing devices that currently operate the first version of the application request the second version, the remote system may send the new portions of data, along with a manifest file for constructing the second version on the client computing devices using the new portions and the first version of the application.

In order to identify the common portions, the remote system may analyze, starting at a beginning of the second version of the application, N-sized portions of the second version. For example, the remote system may generate data, such as a CRC value, using the first N-bytes of the second version of the file and may thereafter compare this value to respective values representing previously stored portions of the first version of the application. For example, the remote system may generate a CRC value of the first 1-MB portion of the second version of the application and may compare this CRC value to a CRC value of a first portion of the first version, a second portion of the second version, and so forth until the remote system detects a match or until there are no further CRC values to compare against. Upon identifying a match, in some instances the remote system may generate additional data associated with the portion of the second version, such as a hash value (using a predefined hash function, such as SHA-1) of the first 1-MB portion of the second version of the application. The remote system may then compare this first hash value to the hash value associated with the candidate portion of the first version of the application. That is, the remote system may compare the hash value of the portion of the second version of the application to the hash value of the portion of the first application having the matching CRC value. If these hash values match, the remote system may store an indication that this particular previously stored portion of the first version resides at the appropriate byte offset of the second version of the application (in this example, beginning at the first byte of the second version).

If, however, the CRC value of the first 1-MB portion of the second version does not match a CRC value of any previously stored portions, or if the hash value of the candidate portion does not match, then the remote system may shift the window by a particular amount, such as one byte. The remote system may then analyze this new portion of the second version of the application (in this case, byte 2 through byte 1,000,001) by computing its CRC value, checking that against respective CRC values of previously stored portions of the first version, and so forth. Thus, the remote system may "walk through" the second version of the file using an N-sized sliding window (e.g., 1-MB) that moves 1 byte at a time. Upon identifying a matching portion, the remote system may store an indication of a beginning byte offset value of the second version of the application and the previously stored portion. For example, if the remote system determines that a 1-MB window of the second version of the application beginning at byte 10 represents a 1-MB portion "A" that formed a portion of the first version of the application, the remote system may store an indication that the second version of the application includes "portion A" at byte 10.

In some instances, however, a second version of an application file may include byte-offset values that point to locations within the file. That is, some files may utilize a distributed table of contents that has a portion that resides at the beginning of the file and additional portions that reside through the file. In some instances, these byte-offset values point to a location of a particular asset within the file, such as the location of a sound, a texture, or the like. As the reader will appreciate, the value of this byte-offset value may change when the location of the asset changes. Thus, while the above sliding-window technique is effective for locating N-sized portions between different versions of the file, even if the locations of these portions have shifted between the versions, in files that utilize this type of distributed table-of-contents approach, the byte-offset value will change in response to the location of the asset changing and, thus, the sliding window would not identify the portion as being the same as a previously identified portion. Stated otherwise, if a byte-offset value has changed between versions, and if this byte-offset value is within the N-sized sliding window of data that the remote system is currently being analyzed, the change in this byte-offset value (i.e., the location to which this table-of-contents structure points), will result in the analyzed portion having a unique CRC and/or hash value that the remote system has not yet seen, thus resulting in the remote system failing to find a matching portion.

In order to lessen the impact of this issue, the systems and techniques described herein attempt to locate these byte-offset values and, by doing so, may identify "clean" portions of data within two respective byte-offset values. This section of clean data may then be stored as a portion, as may data (e.g., CRC value, hash value, etc.) that uniquely identifies this clean portion of data. By doing so, the remote system may identify a matching clean portion of data from a subsequent version of the file, even if the byte-offset values surrounding this clean portion have changed between versions.

To continue the example from above, envision that the remote system has analyzed the first eight sliding windows of the second version of the application file (e.g., bytes 1 to 1,000,000, bytes 2 to 1,000,001, . . . , bytes 8 to 1,000,007) without finding a matching portion from the first version of the application file. Given that the byte-offset values described above are 8 bytes in size, the remote system may begin the techniques for identifying a potential byte-offset value. In order to determine that an 8-byte window comprises a byte-offset value, which may be marked as "dirty" data, the remote system may utilize one or more criteria. For example, the remote system may interpret a number indicated by these 8 bytes and determine whether this number is less than a threshold number, such as a size of the file. If the number is not less than the threshold (e.g., meaning that it could not be pointing to a location of an asset within the file), then the remote system may determine that it does not the criteria. In addition, or in the alternative, the remote system may also determine whether the number is greater than a second threshold number, such as 1-MB, so as to remove from consideration a number of 8-byte numbers that likely do not represent byte-offset values. In some instances, the criteria may also comprise the number being greater than a location of the 8-byte window, or greater than a location of the 8-byte window less some predefined amount (e.g., 1-MB). In still other instances, the remote system may begin checking for byte-offset values (i.e., dirty data) after a predetermined location within the file, such as after the first 1-MB. Thus, the one or more criteria may comprise whether the location of the 8-byte window is past this portion. Of course, while this example describes an 8-byte window, it is to be appreciate windows of other sizes may be utilized in other instances.

If the one or more criteria, are not met, then the remote system may continue to slide the 8-byte window, one byte at a time, to attempt to identify a byte-offset value to mark as dirty data. For example, after checking for a byte-offset value represented by bytes 1-8, the remote system may attempt to determine whether bytes 2-9 represent a byte-offset value.

Envision, for instance, that the remote system determines that the 8-byte window of bytes 200,000-200,007 represent a byte-offset value, or "dirty" data. That is, the remote system may have determined that this 8-byte window satisfied the one or more criteria, such as occurring at a location within the file that is greater than a threshold, representing a number is less than a first threshold number (e.g., the size of the file) but less than a second threshold number (e.g., 2-MB), representing a number that greater than 1-MB less than the current location of the 8-byte window, and/or the like. It is also to be appreciated that these bytes form a portion of "skipped data", in that the 1-MB (or N-byte-size) sliding window did not identify any matching portions including these bytes.

After identifying this potential byte-offset value, the remote system may store a determination that a first portion of the second version of the file (corresponding to bytes 200,000 to 200,007) represent dirty data. After doing so, the remote system may define a second portion of the file that includes this first portion and at least one byte on either side of the first portion. That is, given that if this first portion of the file represents a byte-offset value, then it is likely that neighboring bytes also include data that could change between the versions of the files. That is, this remote system executes an assumption that the byte-offset value has a "blast radius" such that neighboring bytes are also "dirty" data. in some instances, the second portion thus represents the first portion plus a blast radius on either side of the first portion, such as 256 bytes on either side of the first portion, although any other blast radius may be used, which may or more may be the same before and after the first portion. Therefore, in this example, the second portion is between bytes 199,744 and 200,263, which the remote system marks as dirty data.

After marking this second portion as dirty data, the remote system may continue to analyze the skipped data behind the 1-MB sliding window (or other N-sized window) that is attempting to identify matching portions. For example, the 8-byte sliding window may analyze the 8-byte window of 200,001 to 200,008 to determine whether this window represents a byte-offset value or not, before analyzing 200,002 to 200,009, 200,003 to 200,010, and so forth.

Each window that does not meet the criteria for representing a byte-offset value (that is, for representing "dirty" data) may be deemed "clean" data. In this example, envision that the remote system continues to analyze these 8-byte windows and mark a series of subsequent 8-byte windows as clean data. The remote system may be configured to determine when the amount of contiguous clean data is greater than a threshold amount, such as 100,000 bytes or the like. In response to determining that a third portion of the file represents an amount of contiguous clean data that is greater than the threshold size, the remote system may create a portion using the skipped data prior to this third portion. For example, envision that the clean section spans from the end of the second portion at byte 200,008 and has currently reached the threshold of 100,000 bytes (byte 300,007). Thus, the remote system may store a fourth portion of data that precedes the third portion. This fourth portion may include at least the second portion (i.e., the dirty data that includes the blast radius) and any skipped data preceding this second portion (back to the previously created or matched portion). Thus, the remote system may store this fourth portion of data and, additionally, may generate data that identifies this fourth portion, such as a CRC value, hash value, and/or the like. The remote system may also store this identifying data in association with the fourth portion of the data for later user in attempting to identify the same data in later versions of the file. In this example, the fourth portion may have an end of the second portion (byte 200,256) and a beginning that is either the beginning of the second portion (byte 199,744) or earlier, depending on the beginning of the skipped data.

After generating the fourth portion of the data and the data identifying the fourth portion, the remote system may continue to analyze the 8-byte windows until it encounters another byte-offset value. That is, the clean section of data may continue to expand until the remote system identifies an 8-byte window that meets the criteria described above. For example, envision that the remote system determines that the 8-byte window of 301,000 to 301,007 meets the criteria and, thus, represents a byte-offset value. Continuing the nomenclature from above, the remote system may thus determine that this fifth portion of the data represents dirty data. Again, the remote system may define a sixth portion that includes the fifth portion and a blast radius around this fifth portion. Thus, the sixth portion may comprise, in some examples, bytes 299,744 and 300,263.

At this point, the remote system has thus determined two sections of dirty data: the fourth portion (ending at byte 200,263) and the sixth portion (beginning at byte 299,744). Thus, the remote system may store data associated with a seventh portion that resides between these two dirty sections of data, beginning at byte 200,264 and ending at 299,743. As the reader will appreciate, this seventh portion may comprise clean data. In addition to storing this byte range as a portion, the remote system may also generate and store data that identifies this seventh portion of data, such as a CRC value, a hash value, and so forth.

It is to be appreciated that, after generating the seventh portion of data and generating the data that identifies the seventh portion (e.g., CRC value and hash value), the remote system may identify this portion in later versions of the file. For example, envision that the developer uploads a third version of the file at a later time and that the pertinent portion of the third version has not changed relative to the second version. The remote system may utilize the same analysis and, given that this section of data has not changed between versions, may identify, in the third version, a portion of data having a CRC value and hash value that matches the seventh portion of data from the second version. Thus, for client computing devices updating from the second version to the third version, the remote system need not send the seventh portion, given that these devices already have this data. Instead, the remote system may store an indication, in a manifest file associated with updating from version two to version three, an indication of an offset value in the third version at which the seventh portion resides.

In addition to the above, it is to be appreciated that if the conditions are not met for generating portions of dirty data and portions of clean data residing between the dirty data, as described above, then the remote system may generate portions of the data of the predefined size. For example, if the remote system analyzes a predefined portion of data, such as 1-MB, of a file, but the conditions for generating dirty and clean portions of the data do not exist within that 1-MB of data, then the remote system may generate a 1-MB portion and may generate data that identifies this portion, such as a CRC value and a hash value. Similarly, if the 1-MB portion is entirely clean, then the remote system may generate this as a 1-MB portion and may generate the data that identifies this portion.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an example environment 100 that includes multiple client computing devices (e.g., 102(1) and 102(2), collectively "102"), operated by respective users, coupled to a remote computing system 104 configured to provide games and other content items to the client computing devices 102 over one or more networks 106. In some instances, the remote system receives a new version of a game or other application from a device 108 of an application developer and, in response, identifies which portions of the new version are new and which portions were present in previous versions, as well as the location of each portion in the new version. The remote system 104 may then update the game or application on the client computing devices 102 in a manner that is more efficient than simply sending the entire new version to these devices 102.

For example, FIG. 1 illustrates that the remote system 104 includes a datastore 110 that stores multiple versions of a particular application, which may comprise a series of one or more files. For example, the datastore 110 may store different versions of a particular game or other type of application. In this example, the datastore 110 stores a first version 112(1) of an application, a second version 112(2) of the application and, upon receiving a third version 112(3) of the application from the developer device 108, stores the third version 112(3). It is to be appreciated that while FIG. 1 illustrates different versions of one application, the datastore 110 may store any number of different versions of any number of other applications.

FIG. 1 further illustrates, via a datastore 114, that the remote system 104 has identified and stored unique portions 116(1), ..., 116(M) (collectively "116") that make up these different versions of the application (collectively "112"). For example, upon receiving the first version 112(1) of the application, the remote system 104 may analyze this version to generate N-sized portions 116 of the first version and may store these different portions in the datastore 114 (or 110). In addition, the remote system 104 may store portions 116 of different size (e.g., less than N-size) upon receiving and analyzing subsequent versions of the application, as described below. Further, it is to be appreciated that while FIG. 1 illustrates both the datastore 110 and 114, in some instances the remote system 104 may store the versions as portions, rather than storing both the portions 116 and the entirety of the versions 112.

Regardless, FIG. 1 further illustrates that the datastore 114 may store one or more portion identifiers 118(1), ..., 118(M) (collectively "118"), each of which may correspond to one of the particular portions 116. For example, the portion identifiers 118 may comprise any type of data that uniquely or relatively uniquely identifies one of the portions 116. In one example, each of the portion identifiers comprises a CRC value and a hash value associated with one of the particular portions 116. These identifiers 118 may be used to later identify an occurrence of the corresponding portion in a subsequent version.

FIG. 1 further illustrates that the remote system 104 may include a datastore 120, which may store recompilation data for reconstructing different versions 112 of the application. For example, the datastore 120 may store recompilation data 122(1) for recompiling the first version 112(1) of the application, recompilation data 122(2) for recompiling the first version 112(2) of the application, and recompilation data 122(3) for recompiling the first version 112(3) of the application (and receiving and analyzing the third version 112(3)). Each of the recompilation data (collectively "122") may comprise instructions for ordering the different portions 116 for generating the respective version 112 of the application. For example, the recompilation data may indicate that a particular version 112 of the application comprise a first portion 116 associated with portion identifier(s) 118, followed by a second portion associated with portion identifier(s) 118, and so forth.

Finally, FIG. 1 illustrates that the remote system 104 may include a datastore 124 that stores one or more manifests for reconstructing particular versions when client devices already store previous versions. For example, the datastore 124 may include a first manifest 126(1) that enables a client computing device that executes the first version 112(1) of the application to upgrade to the second version 112(2), a second manifest 126(2) that enables a client computing device that executes the first version 112(1) of the application to upgrade to the third version 112(3) (after the remote system 104 receives and analyzes the third version 112(3)), and a third manifest 126(3) that enables a client computing device that executes the first version 112(2) of the application to upgrade to the third version 112(3) (after the remote system 104 receives and analyzes the third version 112(3)). While FIG. 1 illustrates manifests that include instructions for generating a particular version from a previous version, in other instances each manifest may be simply comprise instructions for generating the target version. As such, the datastore 124 may store a first manifest for generating the first version of the application, a second manifest for generating the second version of the application, a third manifest for generating the third version of the application, and so forth. In these instances, each manifest may indicate the portions that make up the version (e.g., as specified by hash values and portion sizes) and the respective locations within the version that each portion resides. Thus, in some instances, the manifests may simply comprise the respective recompilation data 122 and, therefore, the system may include the manifests in the datastore 124 but might not include the recompilation data 122 in the datastore 120. Regardless of whether the manifests are associated with a single target version or indicate how to construct a target version from a specified version, each respective manifest file may include instructions for generating a target version of the application using portions of the application already residing on the client computing device and any new portions in the target version that are not present on the client computing device.

FIG. 1, for example, illustrates two different scenarios. First, a client device 102(1) operating the first version 112(1) of the application requests to update the application, while a second client device 102(2) operating the second version 112(2) also requests to update the application. In this example, the remote system 104 has received and analyzed the third version 112(3). For example, and as described in further detail below, the remote system 104 may have compared the third version 112(3) to the first version 112(1) to identify portions that are new to the third version relative to the first version 112(1) (in this instance, portions 146), as well as to generate the manifest 126(2) comprising instructions for generating the third version 112(3) using portions of the application common to the first and third versions (and, thus, already stored on the client computing device 102(1)) and using the new portions 146. The manifest 126(2) may instruct the client device 102(1) to delete, add, move, and/or duplicate portions to generate the third version 112(3) of the application on the client computing device 102(1). As illustrated, in response to receiving the request to update the first version 112(1) of the application on the client computing device 102(1), the remote system 104 may send the portions 146 and the manifest 126(2). In some instances, the client computing device 102(1) may specify the current version it is executing and the target version it would like to receive, while in other instances the remote system 104 may, by default, update the device 102(1) to the most recent and available version.

Further, the remote system 104 may have compared the third version 112(3) to the second version 112(2) to identify portions that are new to the third version relative to the second version 112(2) (in this instance, portions 148), as well as to generate the manifest 126(3) comprising instructions for generating the third version 112(3) using portions of the application common to the second and third versions (and, thus, already stored on the client computing device 102(2)) and using the new portions 148. The manifest 126(3) may instruct the client device 102(2) to delete, add, move, and/or duplicate portions to generate the third version 112(3) of the application on the client computing device 102(2). As illustrated, in response to receiving the request to update the second version 112(2) of the application on the client computing device 102(2), the remote system 104 may send the portions 148 and the manifest 126(3). As the reader will appreciate, by only sending the new portions 146 or 148 and the manifest files 126(1) or 126(2)—rather than the entirety of the third version 112(3)—the remote system 104 and the computing devices 102(1) and 102(2) are able to accurately and efficiently update the application. For example, the amount of data sent to these devices may be significantly less than if the entire version 112(3) was sent, thus lessening the required network bandwidth as well as the time for the device 102(1) or 102(2) to update the application. Further, it is to be appreciated that while FIG. 1 and other discussions herein describe directly sending the new portions to the client computing devices, in some instances sending these new portions may comprise sending instructions for fetching the new portions to the client computing devices, which in turn fetch the individual portions. For example, the system may send respective URLs for fetching the new portions to the client computing devices, which may send respective requests for the new portions to the received URLs.

In order to update the client computing devices 102 in this manner, the remote system may comprise one or more processors 128 (e.g., central processing unit(s) (CPU(s)) and memory 130. The memory 130 may comprise computer-readable media 118, as well as components stored thereon for performing the techniques described here. The memory 130 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 130 may be implemented as computer-readable storage media ("CRSM"), which may be any available physical media accessible by the processor(s) 128 to execute instructions stored on the memory 130. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information, which can be accessed by the processor(s) 128.

As illustrated, the memory 130 may store a portion-creation component 132, a portion-identification (ID) component 134, a matching-portion component 136, a dirty-data identification component 138, and a clean-data identification component 140. The portion creation-component 132 may be configured to generate portions of a file upon receiving a new file. For example, upon receiving the first version of the application 112(1), the portion-creation component may "walk through" the data to create a series of N-byte-sized portions (or "chunks") of data and may store these as portions 116 in the datastore 114. In addition, the portion-identification component 134 may generate the data for identifying each portion, such as the CRC and hash values, and may store these as portion-IDs 118 in the datastore 114. In addition, upon receiving the second (or subsequent) version 112(2) of the application, the portion-creation component may generate portions of data that are less than N-byte-size. For instance, and as described in further detail below, the portion-creation component 132 may generate portions of "dirty" data and portions of "clean" data and may store these as portions 116 in the datastore 114. Again, the portion-identification component 134 may generate the data for identifying each portion, such as the CRC and hash values, and may store these as portion-IDs 118 in the datastore 114.

The matching-portion component 136, meanwhile, may attempt to identify portions of a new version (e.g., the example third version 112(3)) of an application that match portions in a previous version (e.g., the first 112(1) or second versions 112(2)) of the application. Upon identifying a matching portion, the matching-portion component 136 may store an indication of the identifier(s) 118 of the portion and an offset value at which the identified portion occurs in the new version. This information may be stored in the appropriate manifest 126 in the datastore 124.

In some instances, the matching-portion component 136 "walks through" a new version (e.g., the third version 112(3)) of an application beginning at the start of the version and analyzes an N-sized window of data to determine whether it matches previously stored portions. For example, the matching-portion component 136 may generate a CRC value of the first N-bytes of a new version of an application and compares this CRC value to CRC values (e.g., stored as portion-IDs 118) associated with previously stored portion 116. If a match is encountered with a particular portion, the matching-portion component 136 may compare a hash value of this portion to a hash value (e.g., again stored as portion-ID 118) of the particular portion having the matching CRC value. If no CRC value match is found, or if the hash value does not match, then the matching-portion component 136 may move the window one byte ahead and again perform the analysis. The data behind the sliding window that does not reside in a portion that has been identified as matching a previous portion may be deemed "skipped data". In some instances, if N-bytes are skipped in a contiguous manner (e.g., because no match for found using N sliding windows for these N bytes), then the portion-creation component 132 may create a portion from this skipped data and store it as a portion 116. Again, the portion-ID component may generate portion-IDs (e.g., CRC and hash values) of this portion and may store these as portion-IDs 118.

In some instances, the dirty-data identification component 138 and the clean-data identification component 140 may operate on the skipped data to identify dirty and clean data, respectively, sections of which may be stored as portions 116. For example, the dirty-data identification component 138 may identify, from the skipped data, data that meets one or more criteria 142. In some instances, the criteria 142 comprises the data representing a byte-offset value that, essentially, comprises a table-of-contents structure that points to a location within the file. Thus, the criteria 142 may include the data occurring at a location within the file that is greater than a threshold location (e.g., after a particular offset) and representing a number that is less than a threshold number (given that a number that is larger than possible locations within the file means that the data is not a byte-offset value that points to a location within the file).

In instances where the dirty-data identification component 138 attempts to identify byte-offset values, this component 138 may analyze 8-byte sections of data, given that this is the typical length of a byte-offset value. Of course, in other instances the dirty-data identification component 138 may analyze windows of any other length. In this example, upon identifying an 8-byte window that is likely to comprise a byte-offset value, the dirty-data identification component 138 may mark this 8-byte window as dirty data. In addition, the dirty-data identification component 138 may define a "blast radius" around this 8-byte section, such as 256 bytes before and after this window. Again, the dirty-data identification component 138 may mark this section of data as dirty data. For example, the dirty-data identification component 138 may mark this 520-byte window (256+8+256) as dirty data.

The dirty-data identification component 138 may continue to analyzed the skipped data to determine if subsequent 8-byte windows represent byte-offset values and, hence, dirty data. The clean-data identification component 140, meanwhile, may determine that any skipped data that is not flagged as dirty by the dirty-data identification component 138 represents clean data. The clean-data identification component 140 may mark this data as clean. In some instances, in response to identifying a contiguous section of clean data that is greater than a threshold size 144, the clean-data identification component may instruct the portion-creation component 132 to generate a portion of data beginning at the end of the blast radius of the preceding dirty data back to a lesser of N-bytes or a location of a previously identified or created portion. As with the creation of other portions, the portion-ID component 134 may generate portion-IDs 118 of this section and store them in datastore 114. Further, in some instances the matching-portion component 136 may be configured to determine whether these portion-IDs match any previously stored portion-IDs 118.

After generating this portion of dirty data, the clean-data identification component 140 may continue to mark subsequently analyzed skipped data as "clean" until the dirty-data identification component 138 identifies a byte-offset value and, hence, dirty data. After the dirty-data identification component 138 identifying this 8-byte window of dirty data, the dirty-data identification component 138 may again define a blast radius around this 8-byte window. After the dirty-data identification component 138 has done so, the clean-data identification component 140 may instruct the portion-creation component 132 to generate a portion from the clean data, beginning at the end of the blast radius of the previous dirty data and ending one byte prior to the beginning of the blast radius of the newly identified dirty data. The portion-creation component 132 may store this as a portion 116 within the datastore 114, while the portion-identification component 134 may generate portion-IDs of these clean portion and store them as portion-IDs 118 within the datastore 114. In some instances, the matching-portion component 136 may compare, prior to the portion-creation component 132 creating the clean portion, the portion-IDs to previously stored portion-IDs to determine whether this clean data has been seen and stored before. If so, rather than re-create the portion, the matching-portion component 136 may store an indication of the previously stored portion and the current offset value in the appropriate manifest.

It is noted that the client devices 102 may be implemented as any suitable type of computing device configured to execute applications, such as video games, productivity applications, and/or the like. The client devices 102 may comprise, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, a music player, a voice-controlled assistant, and/or any similar computing device. The client devices 102 may communicate with the remote computing system 104 over the computer network(s) 106. The computer network(s) 106 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 104 may, in some instances be part of a network-accessible computing platform that is maintained and accessible via the computer network(s) 106. Network-accessible computing platforms such as this may be referred to using terms such as "on-demand computing", "software as a service (SaaS)", "platform computing", "network-accessible platform", "cloud services", "data centers", and so forth.

In some embodiments, the remote computing system 104 acts as, or has access to, a video game platform that implements a video game service to distribute (e.g., download, stream, etc.) video games (or any other type of content item) to the client devices, such as the client devices 102. In an example, each client device may install a client application thereon. The installed client application may be a video-game client (e.g., gaming software to play video games). A client device 102 with an installed client application may be configured to download, stream, or otherwise receive programs (e.g., video games, and content thereof) from the remote computing system 104 over the computer network(s) 106. Any type of content-distribution model can be utilized for this purpose, such as a direct purchase model where programs (e.g., video games) are individually purchasable for download and execution on a client device 102, a subscription-based model, a content-distribution model where programs are rented or leased for a period of time, streamed, or otherwise made available to the client devices. Accordingly, an individual client device 102 may include one or more installed video games that are executable by loading the client application.

The client device 102 may be used to register with, and thereafter login to, a video game service. A user may create a user account for this purpose and specify/set credentials (e.g., passwords, PINs, biometric IDs, etc.) tied to the registered user account. As a plurality of users interact with the video game platform (e.g., by accessing their user/player profiles with a registered user account, playing video games on their respective client devices, etc.), the client devices send data to the remote computing system 104. The data sent to the remote computing system 104, for a given client device 102, may include, without limitation, user input data, video game data (e.g., a current version being executed, game performance statistics uploaded to the remote system, etc.), social networking messages and related activity, identifiers (IDs) of the video games played on the client device 108, and so on. This data can be streamed in real-time (or substantially real-time), sent the remote system 104 at defined intervals, and/or uploaded in response to events (e.g., exiting a video game).

Figure 2:
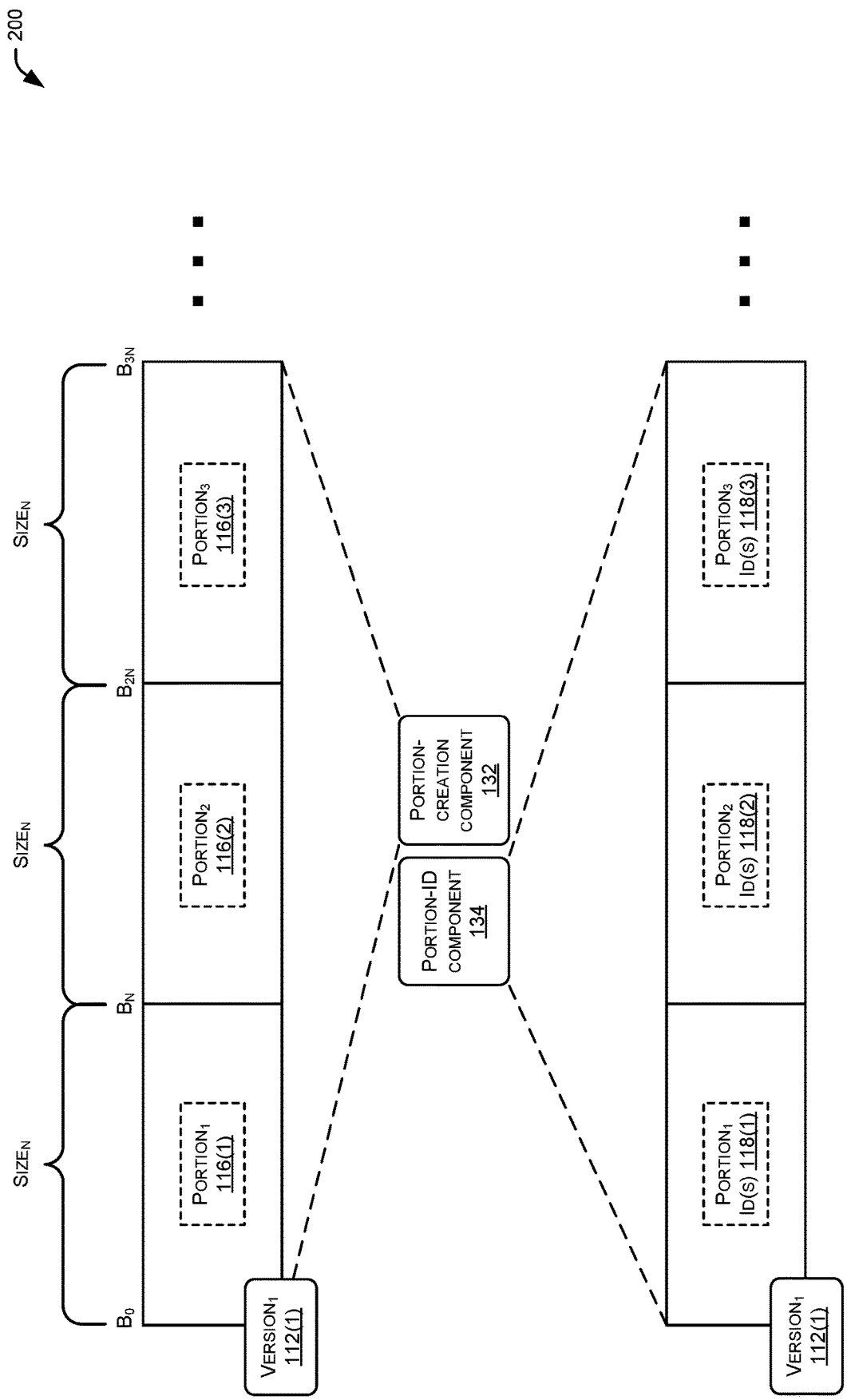

FIG. 2 illustrates an example scenario 200 where the portion-creation component 132 creates N-byte-sized portions of a first version 112(1) of a file, while the portion-identification component 134 generates data associated with these respective portions for identifying the portions. The data may comprise check values (e.g., cyclic redundancy check (CRC) values), hash values (e.g., SHA-1 values), and/or the like.

As illustrated, upon receiving the first version of the file 112(1), the portion-creation component may walk through the first version 112(1), starting at a beginning of the first version 112(1). The portion-creation component may create portions of N-bytes (e.g., 1-MB portions) and may store these portions in the datastore 114. For example, the portion-creation component 132 may generate and store data corresponding to a first portion 116(1), a second portion 116(3), a third portion 116(3), and so forth.

Meanwhile, the portion-identification component 134 may generate one or more portion-IDs associated with each of these portions. For example, the portion-identification component 134 may generate one or more portion-IDs 118(1) for the first portion 116(1), one or more portion-IDs 118(2) for the second portion 116(2), one or more portion-IDs 118(3) for the third portion 116(3), and so forth. In some instances, these portion-IDs 118 comprise a CRC value and a hash value for each portion.

In some instances, meanwhile, the techniques described below may apply equally to ingestion of a first version of an application. For example, a look-ahead, sliding window may be used to determine whether an N-byte-sized portion of data in the first version matches any previously seen N-byte-sized portions. Of course, given that the datastore will be empty, to begin, for the beginning of the analysis of this first version of the file, no match will be initially found. Instead, upon generating a first portion, the first portion may be stored in the datastore, as may be identifying information associated with this portion, such as a CRC value and/or a hash value. However, as the datastore fills up with this type of information, the information may be used to identify subsequent portions of the first version of the file. That is, given that some portions may repeat within the first version of the file, these portions may be first stored and later recognized as matching portions during the analysis.

Figure 3:
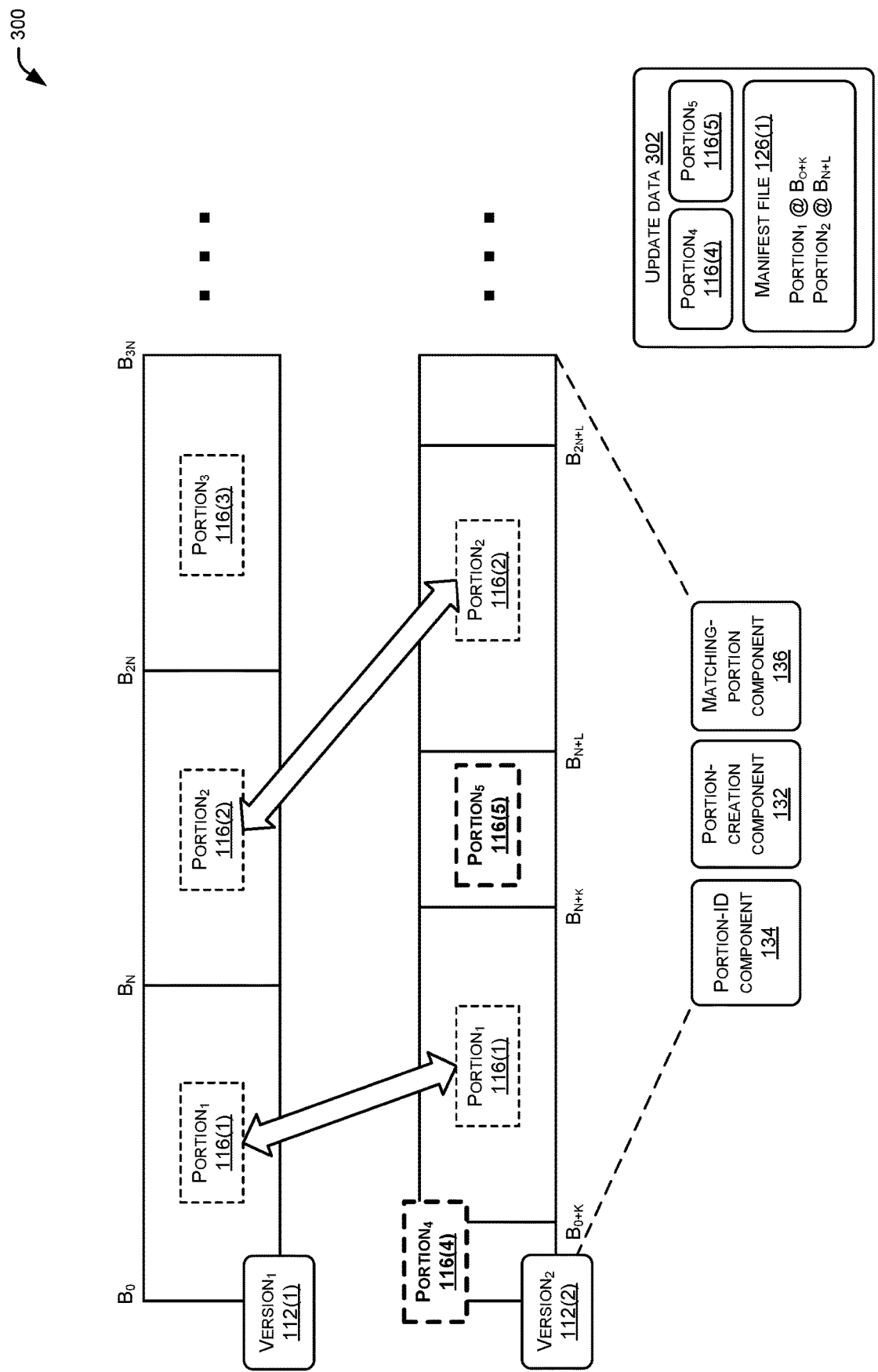
FIG. 3 illustrates an example scenario where a matching-portion component of the remote system of FIG. 1 analyzes a second version of the file to identify which portions of the second version were present in the first version and which portions are new to the second version. For example, the matching-portion component may generate a CRC value for an N-byte-sized portion of data to identify a potential matching portion and, after finding a potential match, may generate a hash value to confirm the match. If no match is found, the portion-creation component may generate a portion corresponding to the new data in the second version. The remote system may then generate update data that includes the new portion(s) and a manifest containing recompilation instructions to generate the second version of the file using the first version and the new portion(s) of the second version.

Furthermore, while FIG. 3 illustrates generating N-byte-sized portions of data, in some instances the techniques described below for generating dirty and/or clean portions of data may apply equally to the ingestion and analysis of the first version of the application. For example, rather than generate all N-byte-sized windows, as shown in FIG. 2, in some instances the remote system may generate smaller portions in the first version of the file, similar to those illustrated in FIG. 3.

FIG. 3 illustrates an example scenario 300 where the matching-portion component 136 analyzes a second version 112(2) of the file to identify which portions of the second version 112(1) were present in the first version and which portions are new to the second version 112(2). For example, the matching-portion component 136 may generate a CRC value for an N-byte-sized portion of data to identify a potential matching portion and, after finding a potential match, may generate a hash value to confirm the match. If no match is found, the portion-creation component 132 may generate a portion corresponding to the new data in the second version. The remote system 102 may then generate update data 302 that includes the new portion(s) (e.g., portions 116(4) and 116(5)) and a manifest file 126(1) containing recompilation instructions to generate the second version of the file using the first version 112(1) and the new portion(s) of the second version 112(2).

The matching-portion component 136 may begin by analyzing the first N-bytes of the second version 112(2) to determine whether these N-bytes match any N-byte portions previously stored as portions 116 in the datastore 114. For example, the matching-portion component 136 or the portion-ID component 134 may generate a first ID (e.g., a CRC value) of the first N-bytes of the second version and compare this to IDs 118 (e.g., CRC values) of respective portions 116 stored in the datastore 114. Upon finding a match, the matching-portion component 136 or the portion-ID component 134 may generate a second ID (e.g., a hash value) of the first N-bytes of the second version and compare this to the portion having the matching CRC value. Upon finding a match, the matching-portion component would store an indication in the manifest file 126(1). In this example, however, no match is found and, thus, the matching-portion component slides the window by one byte and performs the analysis again.

As illustrated, upon analyzing the N-byte-window between $B_{0+K}$ and $B_{N+K}$, the matching-portion component 136 determines that this window corresponds to previously stored portion 116(1). That is, the matching-portion component 136 generated a CRC value of this N-byte window, determined that it matching the CRC value associated with the portion 116(1), generated a hash value of this window, and determined that the hash value also matched the hash value associated with the portion 116(1). Thus, the matching-portion component 136 may store an indication, in the manifest file 126(1), that portion 116(1) occurs in the second version 112(2) of the file beginning at $B_{0+K}$.

In addition, after identifying this match, the portion-creation component 134 may create a portion 116(4) from the previously skipped data and may store this portion 116(4) in the datastore. Further, the portion-identification component 134 may generate and store corresponding portion-IDs in the datastore 114. In some instances, meanwhile, the dirty-data identification component 138 and the clean-data identification component 140 operate on this skipped data, as described below with reference to FIG. 4.

FIG. 3 further illustrates that the matching-portion component 136 may identify that portion 116(2) resides in the second version 112(2) of the file between $B_{N+L}$ and $B_{2N+L}$. Thus, the matching-portion component 136 stores a corresponding indication in the manifest file 126(1), while the portion-creation component 132 generates a new portion 116(5) corresponding to the skipped data. As illustrated, the update 302, which is sent to devices that are to update from the first version 112(1) of the application to the second version 112(2), includes the new portions 116(4) and 116(5), as well as the manifest file 126(1) including the recompilation instructions using the new portions and the first version 112(1) already stored on these devices.

Figure 4:
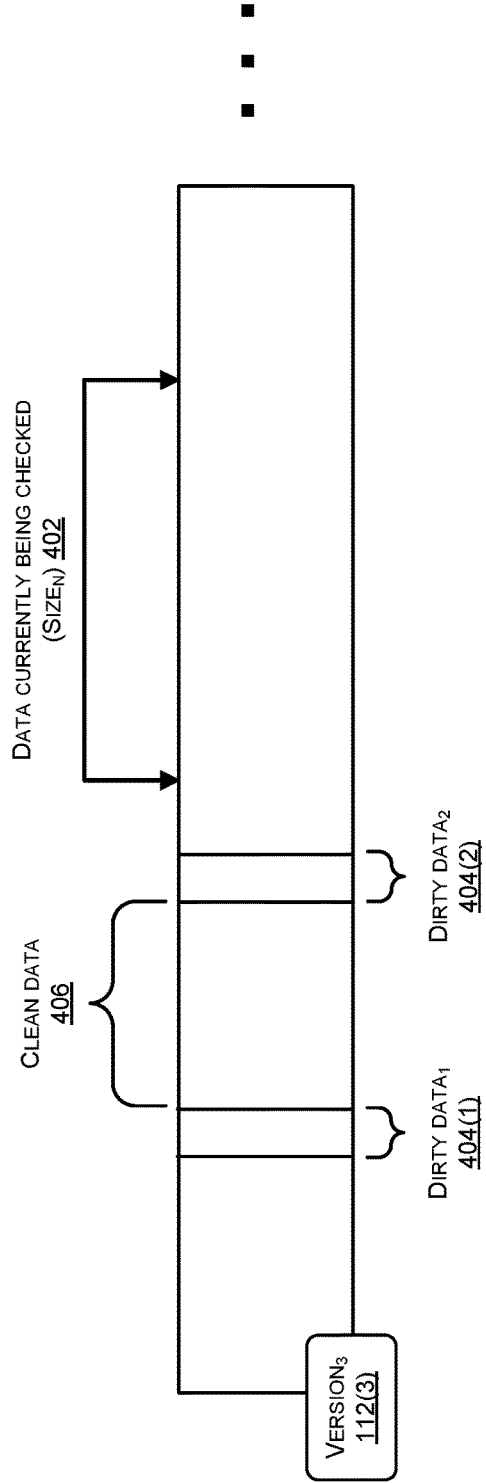
FIG. 4 illustrates an example scenario wherein the remote system utilizes the portion-matching component to identify, from a third version of the file, any N-byte-sized portions of the third version that were present in the first or second versions of the file. In addition, a dirty-data identification component may be configured to identify, from skipped data (i.e., data for which the portion-matching component did not find a match), "dirty data" that meets one or more criteria, such as criteria indicating that the data may comprise a byte-offset value pointing to a location in the file. In addition, a clean-data identification component may identify "clean data" that does not meet the criteria and, in some instances, may create a portion of clean data as well as data that identifies the portion of clean data, similar to the illustration of FIG. 2.

FIG. 4 illustrates an example scenario 400 wherein the remote system 104 utilizes the matching-portion component 136 to identify, from a third version 112(3) of the file, any N-byte-sized portions of the third version 112(3) that were present in the first 112(1) or second 112(2) versions of the file. In addition, dirty-data identification component 138 may be configured to identify, from skipped data (i.e., data for which the portion-matching component 136 did not find a match), "dirty data" that meets one or more criteria 142, such as criteria indicating that the data may comprise a byte-offset value pointing to a location in the file. In addition, the clean-data identification component 140 may identify "clean data" that does not meet the criteria 142 and, in some instances, may create a portion of clean data as well as data that identifies the portion of clean data, similar to the illustration of FIG. 2.

For example, FIG. 4 illustrates that the matching-portion component 136 currently analyzes an N-sized window 402 of data in the third version 112(3) of the application. The dirty-data-identification component 138 and the clean-data-identification component 140, meanwhile, may analyze skipped data that is "behind" the window currently being analyzed by the matching-portion component 136. In this illustrated example, the dirty-data-identification component 138 first identifies a first section of dirty data 404(1) and a second section of dirty data 404(2). Thus, the clean-data-identification 140 identifies a section of clean data 406 residing between these two sections of dirty data.

FIGS. 5A-H collectively illustrate a scenario 500 of creating a portion of clean data, between two sections of dirty data, and data that identifies the clean data. This portion of clean data and its identifying data may then be stored. The identifying data may later be used to identify the same section of clean data in subsequent versions of the file.

FIG. 5A begins the illustration of the scenario and includes, at "1", determining that a first portion 502 of the third version 112(3) meets one or more criteria for being labeled dirty data. For example, the dirty-data-identification component 138 may determine that this 8-byte section of data corresponds to a byte-offset value that points to a location in the file, given that it meets the criteria 142 described above.

Figure 5B:
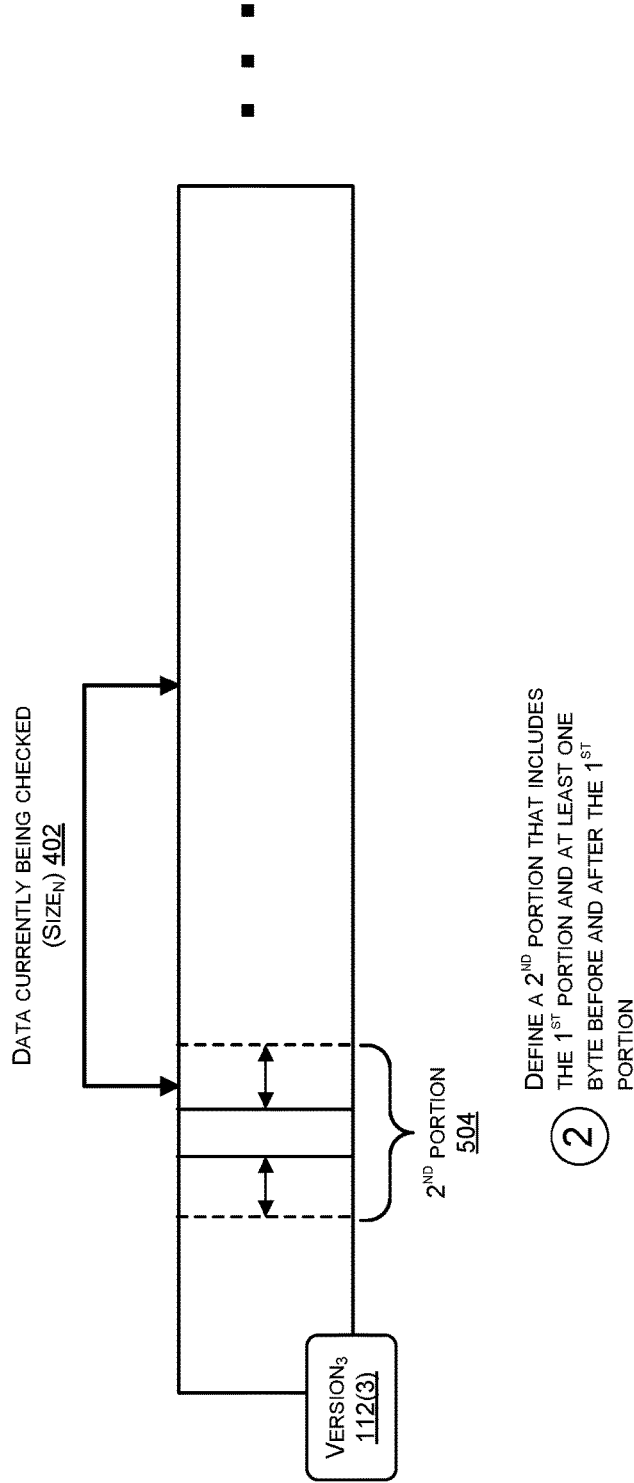

FIG. 5B continues the illustration and includes, at "2", defining a second portion 504 of the third version 112(3) that includes the first portion 502 and at least one byte prior to the first portion and at least one byte after the first portion. For example, the dirty-data-identification component 138 may define a second portion 504 that includes the detected byte-offset value and a surrounding blast radius.

Figure 5C:
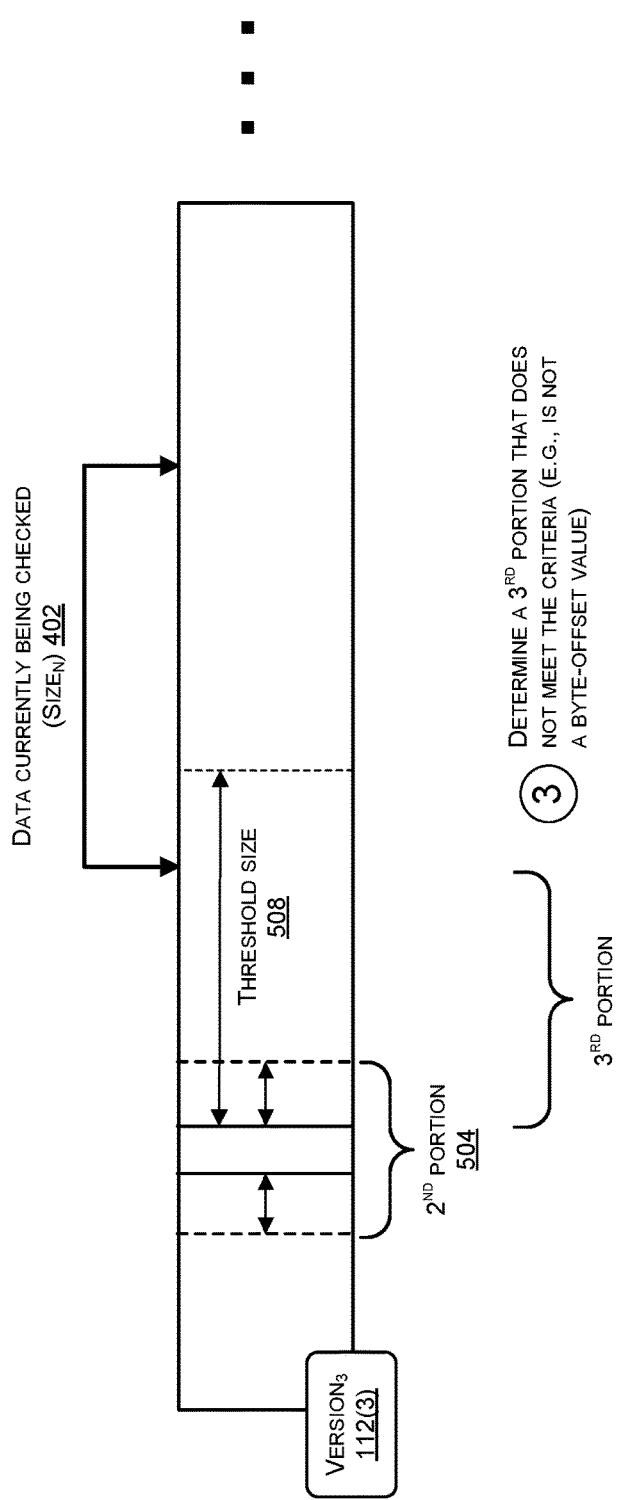

FIG. 5C continues the illustration of the scenario and includes, at "3", determining that a third portion 506 of the third version 112(3), subsequent to the second portion 504, does not comprise meet the criteria 142. For example, the clean-data-identification component 140 may determine that this third portion of data does not comprise a byte-offset value that points to a location in the file.

FIG. 5D continues the illustration and includes, at "4", determining that the third portion 506 has now exceeded a threshold size 508. That is, the clean-data-identification component 140 may determine that the section of clean data (e.g., data that is free from a byte-offset value) is greater than the threshold size 144 described above.

Figure 5E:
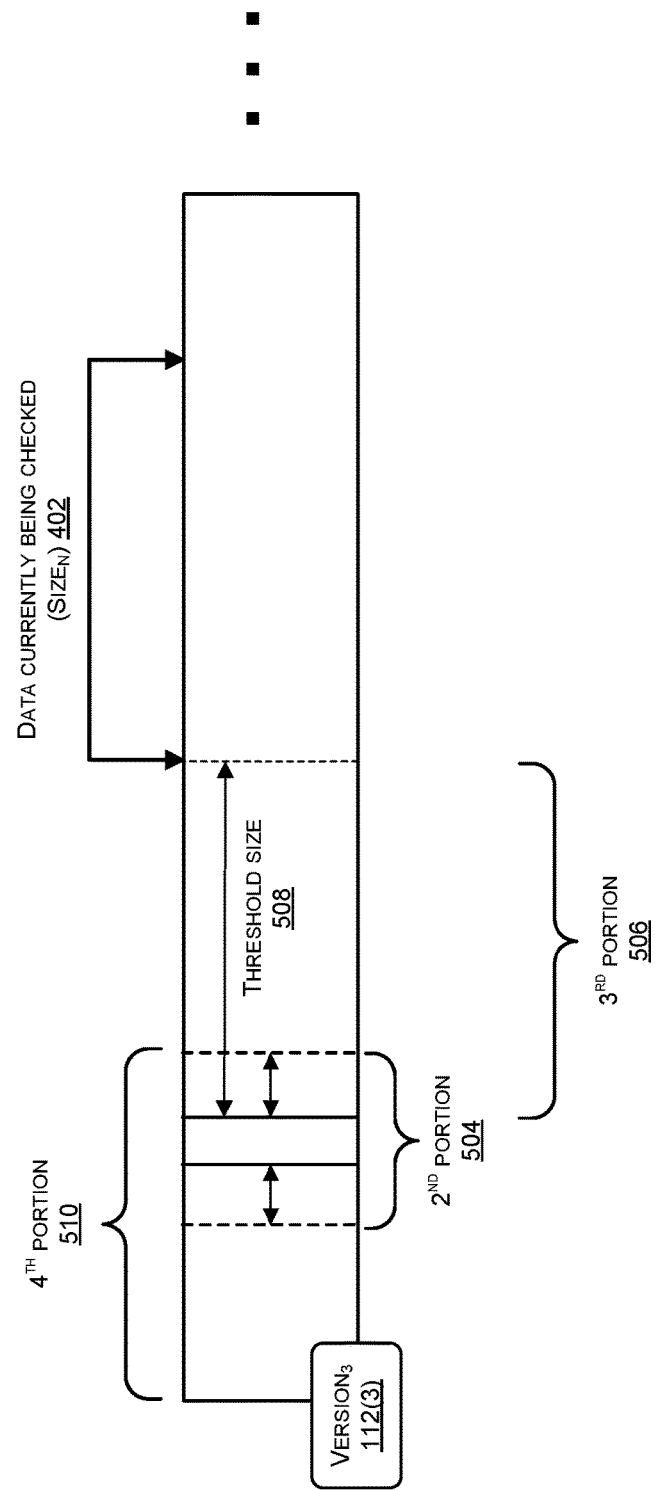

FIG. 5E continues the illustration of the scenario 500 and includes, at "5", generating, at least partly in response to determining that the third portion 506 is greater than the threshold size 508, a fourth portion 510 of the third version 112(3) of the file. For example, the portion-creation component 132 may create the fourth portion 510, which may comprise the second portion 504 and one or more bytes prior to the second portion 504. In addition, the portion-ID component 134 may generate data that identifies the fourth portion 510, such as a CRC value and hash value of this portion 510.

Figure 5F:
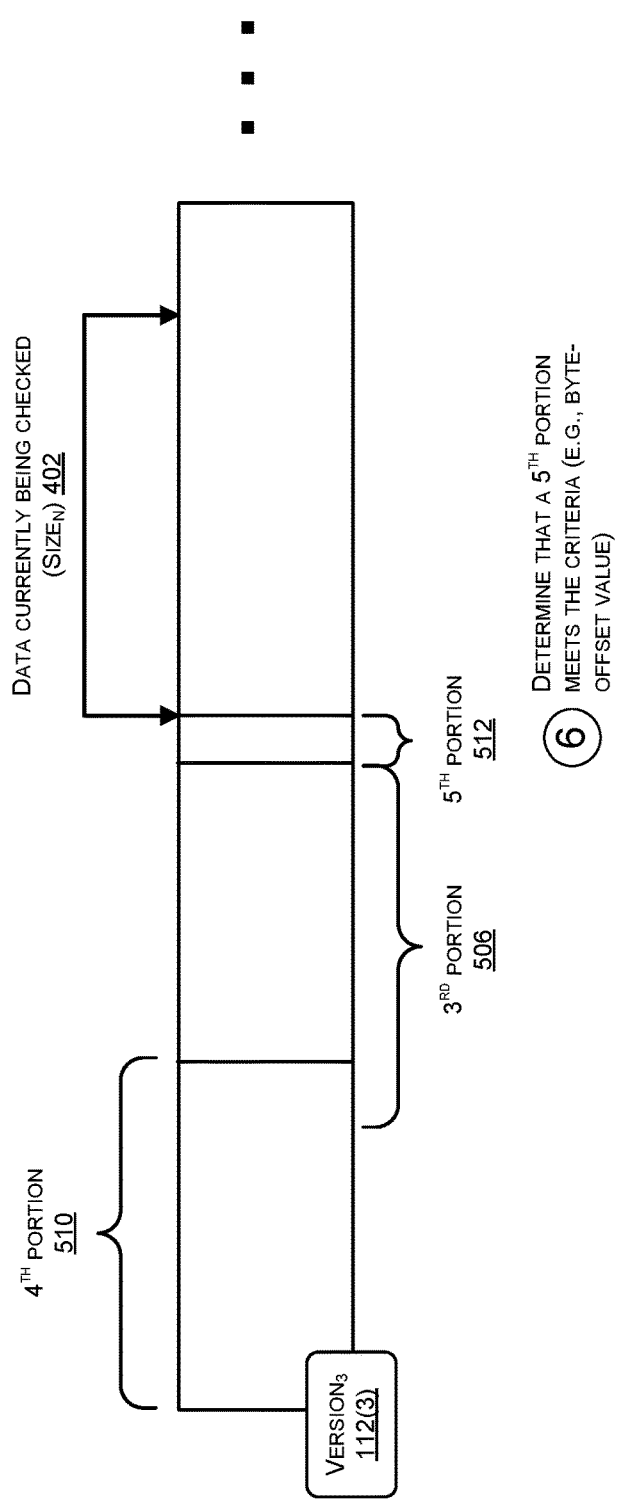

FIG. 5F continues the illustration and includes, at "6", determining that a fifth portion 512 of the third version 112(3), subsequent to the third portion 506, meets the one or more criteria 142 (e.g., comprises a second byte-offset value that points to a location in the first version of the file).

Figure 5G:
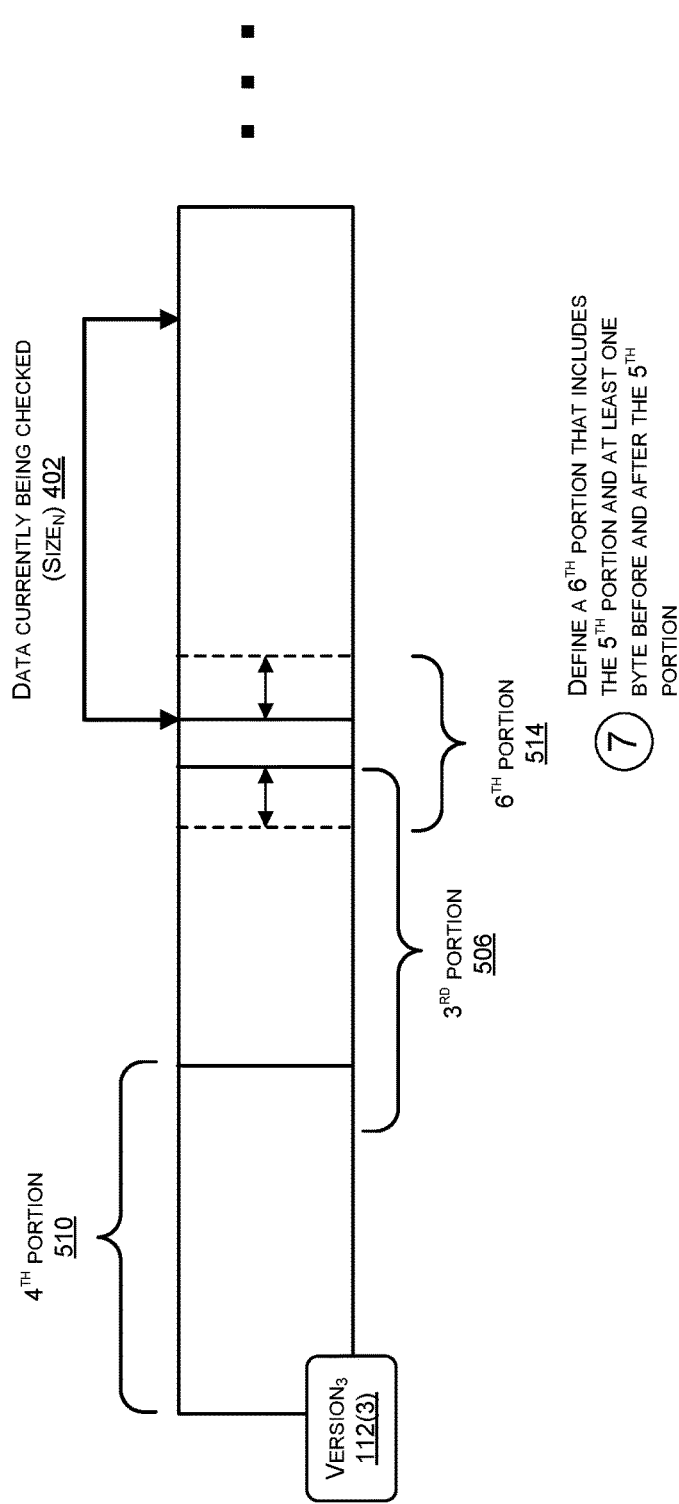

FIG. 5G continues the illustration of the scenario 500 and includes, at "7", defining a sixth portion 514 of the third version 112(3) that includes the fifth portion 512 and at least one byte prior to and after the fifth portion 512. For example, the dirty-data-identification component 138 may define the sixth portion 514 that includes the detected byte-offset value and a surrounding blast radius.

Figure 5H:
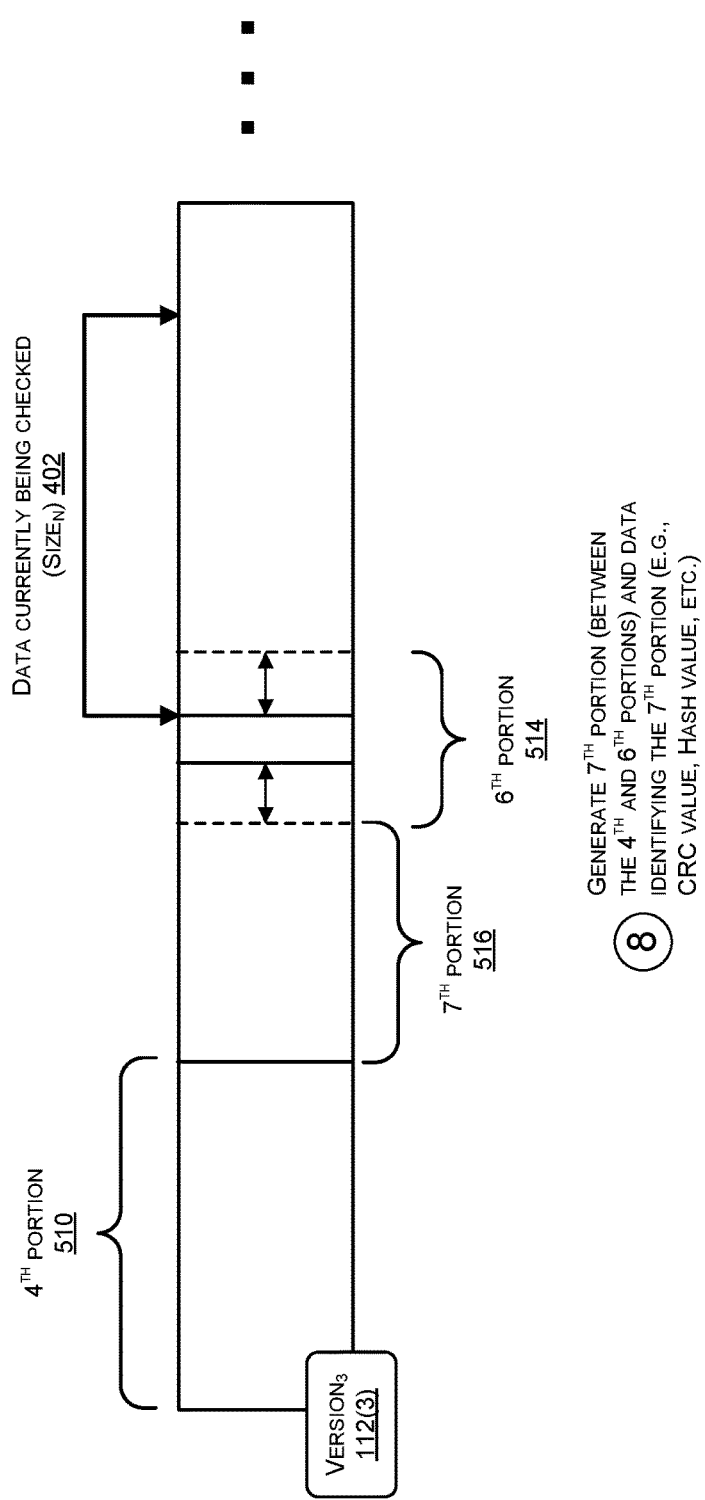

FIG. 5H concludes the illustration of the scenario 500 and includes, at "8", generating a seventh portion 516 of the third version 112(3) of the file, residing between the fourth portion 510 and the sixth portion 514. For example, the portion-creation component 132 may generate and store the seventh portion 516 in the datastore 114. Further, the portion-identification component 134 may generate, and store in the datastore 114, data that identifies the seventh portion 516, such as a CRC value and a hash value of this portion. In some instances, the matching-portion component 136 may attempt to identify a portion corresponding to the seventh portion 516 prior to the operation at "8".

Figure 6A:
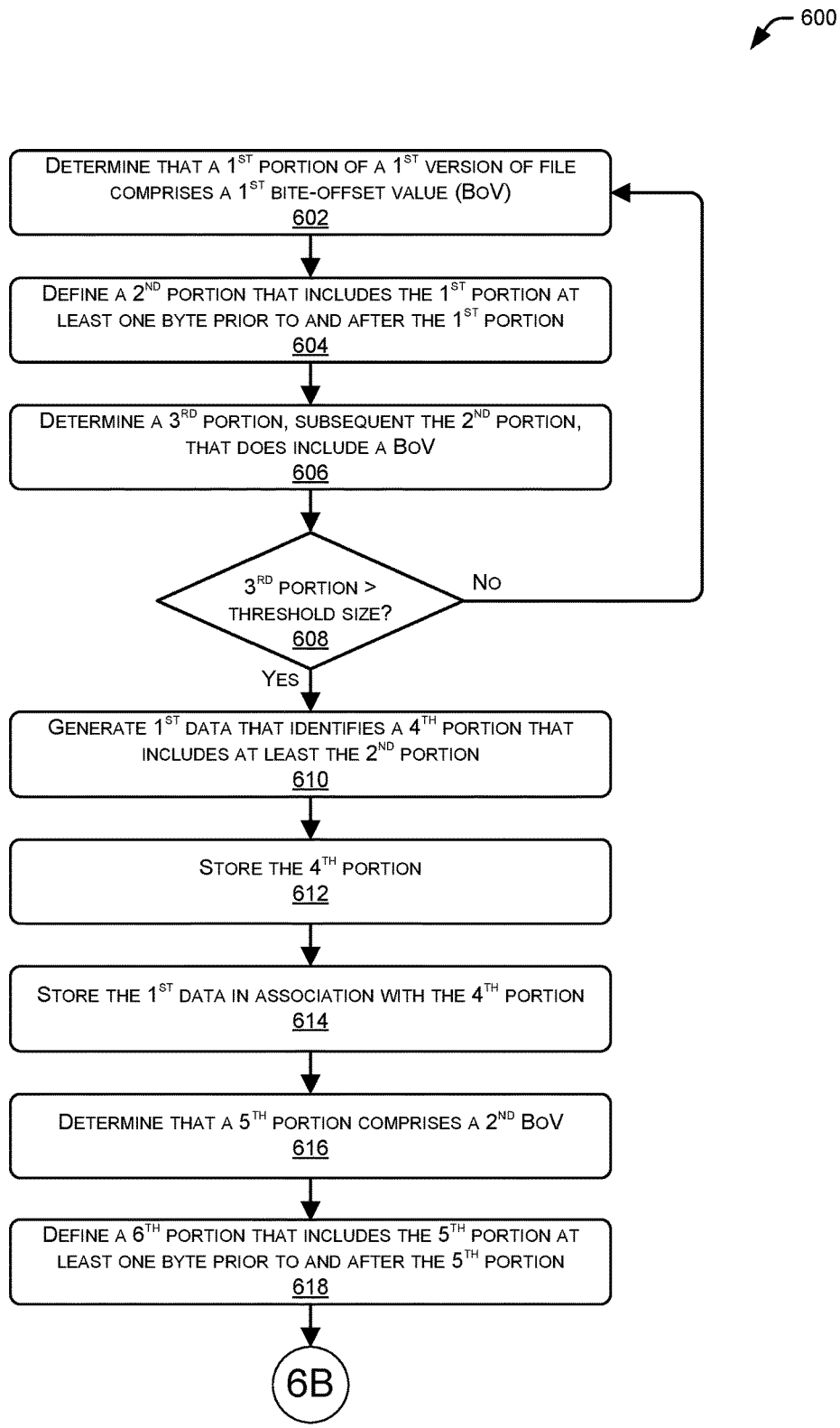
FIGS. 6A-B collectively illustrate a flow diagram of an example process for creating a portion of clean data, between two sections of data that include respective byte-offset values, and data that identifies the clean data. In addition, the data that identifies the portion of clean data may be used to determine whether this portion of data was present in a previous version of the file. If not, the portion of clean data may be stored, along with the data that identifies this portion.
Figure 6B:
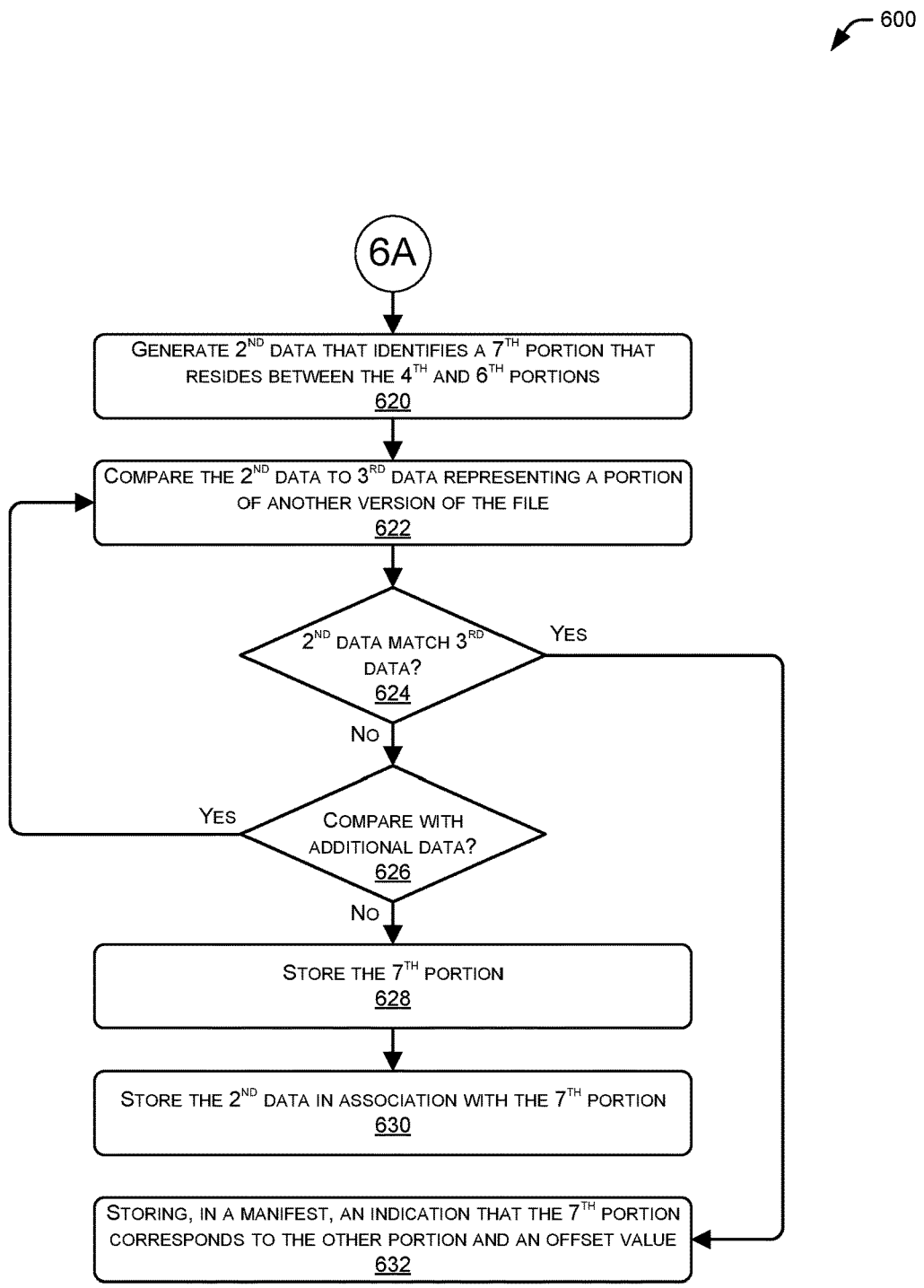

FIGS. 6A-B collectively illustrate a flow diagram of an example process 600 for creating a portion of clean data, between two sections of data that include respective byte-offset values, and data that identifies the clean data. In addition, the data that identifies the portion of clean data may be used to determine whether this portion of data was present in a previous version of the file. If not, the portion of clean data may be stored, along with the data that identifies this portion. This process, and each process described herein, is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some instances, the computing system 104 may be configured to perform some or all of the operations, although in other instances other devices may additionally or alternatively perform some or all of the operations.

An operation 602 represents determining that a first portion of a first version of a file comprises a first byte-offset value that points to a location in the first version of the file. For example, the dirty-data identification component 138 may determine that the first portion, such as an 8-byte section of the data, meets the one or more criteria for representing a byte-offset value. As described above, this may include determining that the number indicated by the 8-byte value is less than a first threshold number (e.g., the size of the file), greater than a second threshold number (e.g., 1-MB), occurs at a location of the file that is greater than a threshold location (e.g., 1-MB from the beginning of the file), and/or points to a location that is greater than a current location of the 8-byte window (or greater than the current location, less a predefined amount, such as 1-MB). Of course, while a few example criteria are described, other criteria may be used.

An operation 604 represents defining a second portion of the first version of the file that includes the first portion and at least one byte prior to the first portion and at least one byte after the first portion. In some instances, the dirty-data identification component 138 may define a "blast radius" around the first portion. This blast-radius may comprise, for example 256 bytes on either or both sides of the 8-byte window. Thus, the second portion may comprise the first portion plus the blast radius.

An operation 606 represents determining that a third portion of the first version of the file, subsequent to the second portion, does not comprise a byte-offset value that points to a location in the first version of the file. For example, the dirty-data-identification component 138 may determine that this portion of data does not the meet the criteria discussed above.

An operation 608 represents determining whether the third portion is greater than a threshold size. For example, the clean-data-identification component 140 may determine that the identified portion of clean data is greater than the threshold size 144. If not, then the process 600 may return to the operation 602.

If so, however, then at an operation 610, the process 600 may include generating, at least partly in response to determining that the third portion is greater than the threshold size, first data that identifies a fourth portion of the first version of the file that is prior to the third portion, the fourth portion including at least the second portion. For example, the portion-identification component 134 may generate a CRC value, hash value, and/or the like.

An operation 612 represents storing the fourth portion, while an operation 614 represents storing the first data in association with the fourth portion. For example, the portion-creation component 132 may generate a portion of data corresponding to the fourth portion and may store this in the datastore 114. The portion-identification component 134, meanwhile, may store the first data as portion ID(s) 116 in the datastore 114.

An operation 616 represents determining that a fifth portion of the first version of the file, subsequent to the third portion, comprises a second byte-offset value that points to a location in the first version of the file. For example, the dirty-data identification component 138 may determine that the fifth portion, such as an 8-byte section of the data, meets the one or more criteria for representing a byte-offset value. Again, this may include determining that the number indicated by the 8-byte value is less than a first threshold number (e.g., the size of the file), greater than a second threshold number (e.g., 1-MB), occurs at a location of the file that is greater than a threshold location (e.g., 1-MB from the beginning of the file), and/or points to a location that is greater than a current location of the 8-byte window (or greater than the current location, less a predefined amount, such as 1-MB). Again, while a few example criteria are described, other criteria may be used.

An operation 618 represents defining a sixth portion of the first version of the file that includes the fifth portion and at least one byte prior to the fifth portion and at least one byte after the fifth portion. For example, the dirty-data identification component 138 may define a "blast radius" around the first portion. This blast-radius may comprise, for example 256 bytes on either or both sides of the 8-byte window. Thus, the sixth portion may comprise the fifth portion plus the blast radius.

FIG. 6B continues the illustration and includes, at an operation 620, generating second data that identifies a seventh portion of the first version of the file, the seventh portion residing between the fourth portion and the sixth portion. For example, the portion-identification component 134 may generate a CRC value, hash value, and/or the like of the seventh portion.

An operation 622 represents comparing the second data to third data representing a first portion of a second version of the file. For example, the matching-portion component 136 may compare a CRC value of the seventh portion to a CRC value of the first portion of the second version of the file. If the matching-portion component 136 determines that these values match, then the matching-portion component 136 may compare a hash value of the seventh portion to a hash value of the first portion of the second version.

An operation 624 represents determining whether the second and third data match. In some instances, this may include determining whether the both the CRC values and the hash values match. If not, then the process 600 proceeds to determine, at an operation 626, whether there is additional data (e.g., associated with other stored portions) for comparing to the second data. If so, the process 600 may return to the operation 622. For example, if the CRC values don't match, the matching-portion component 136 may determine whether the CRC value matches a different portion of the second version and, if so, then whether the hash values of these portions match.

If there is no further additional data to compare the second data to, however, then the operation may proceed to an operation 628, which represents storing the seventh portion. For example, the portion-creation component 132 may generate a portion of data corresponding to the seventh portion and may store this in the datastore 114. An operation 630, meanwhile, represents storing the second data (e.g., CRC value and hash value) in association with the seventh portion.

If, however, the second data does match the third data, then an operation 632 represents storing, in a manifest associated with the first version of the file, an indication that an offset value associated with a beginning of the seventh portion corresponds to the third data associated with the first portion of the second version of the file. For example, the manifest may store an indication of a hash value and a size of the first portion of the second version that is to reside at the particular offset, with the hash value and size functioning to identify the portion.

Figure 7:
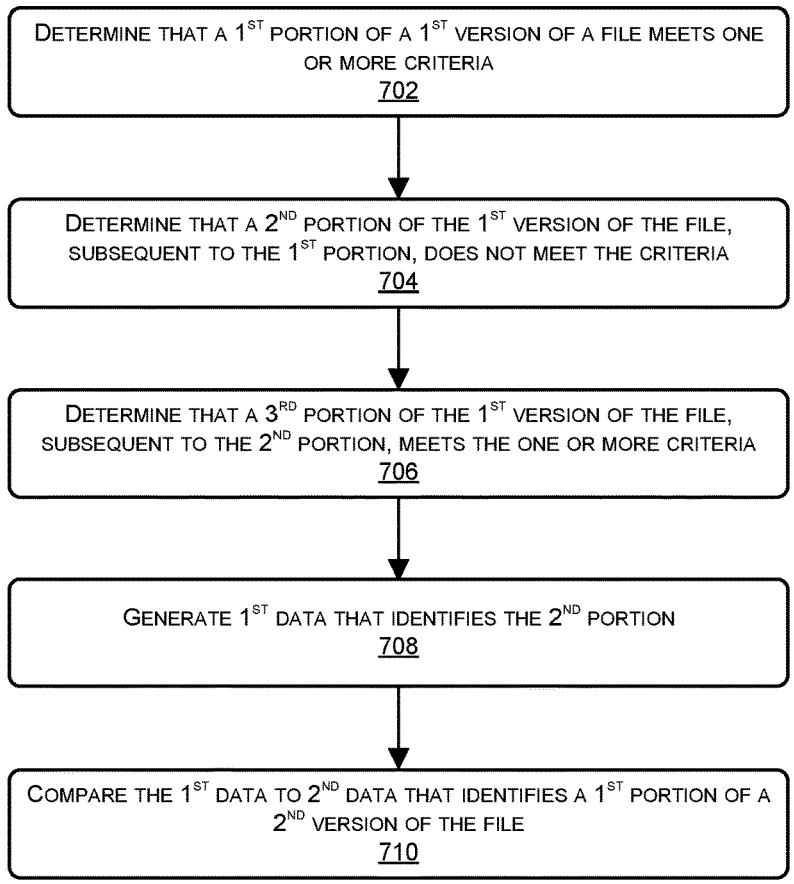
FIG. 7 illustrates a flow diagram of an example process for generating data that identifies a portion of data that does meet one or more criteria and that resides between respective portions of data that does meet the one or more criteria.

FIG. 7 illustrates a flow diagram of an example process 700 for generating data that identifies a portion of data that does meet one or more criteria and that resides between respective portions of data that does meet the one or more criteria.

An operation 702 represents determining that a first portion of a first version of a file meets one or more criteria. For example, this operation may include determining that the first portion of the first version of the file comprises a byte-offset value that points to a location in the first version of the file. Additionally, or alternatively, this operation may include determining that the first portion of the first version of the file corresponds to a number that is less than a threshold number, occurs at a location in the file that is greater than a threshold location, and/or the like. Further, in some instances, a subsequent operation may further include defining a portion that includes the first portion and at least one byte prior to and after the first portion.

An operation 704 represents determining that a second portion of the first version of the file that is subsequent to the first portion does not meet the one or more criteria. An operation 706 represents determining that a third portion of the first version of the file that is subsequent to the second portion meets the one or more criteria. In some instances, a subsequent operation may further include defining a portion that includes the third portion and at least one byte prior to and after the third portion.

An operation 708 represents generating first data that identifies the second portion. In some instances, this operation occurs at least partly in response to determining that the second portion is greater than a threshold size. Further, in response to determining that the second portion is greater than a threshold size, an operation may include generating a portion of data that is based at least in part, and includes at least, the first portion of data. Furthermore, in some instances the generating of the first data comprises generating a check value (e.g., CRC value) using the second portion and generating a hash value using the second portion.

An operation 710, meanwhile, represents comparing the first data to second data that identifies a first portion of a second version of the file. In some instances, subsequent operations may include determining, based at least in part on the comparing, that the third portion corresponds to the first portion of the second version of the file and storing, in a manifest associated with the first version of the file, an indication that an offset value associated with a beginning of the third portion corresponds to the second data associated with the first portion of the second version of the file. In some instances, for example, the first portion of the second version may be identified in the manifest by a hash value and a size of the first portion of the second version.

In some instances, the process 700 is performed on data that has not been determined to form a portion of a matching N-byte-sized window of data. Thus, the operations of the process may further include generating, prior to the determining that the first portion of the first version of the file meets the one or more criteria, second data associated with a fourth portion of the first version of the file. In addition, the process may include comparing the second data to respective data associated with the respective portions of the second version of the file and determining that the second data does not correspond to the respective data. In these instances, the operations 702 through 710 may occur at least partly in response to the determining that the second data does not correspond to the respective data.

Figure 8:
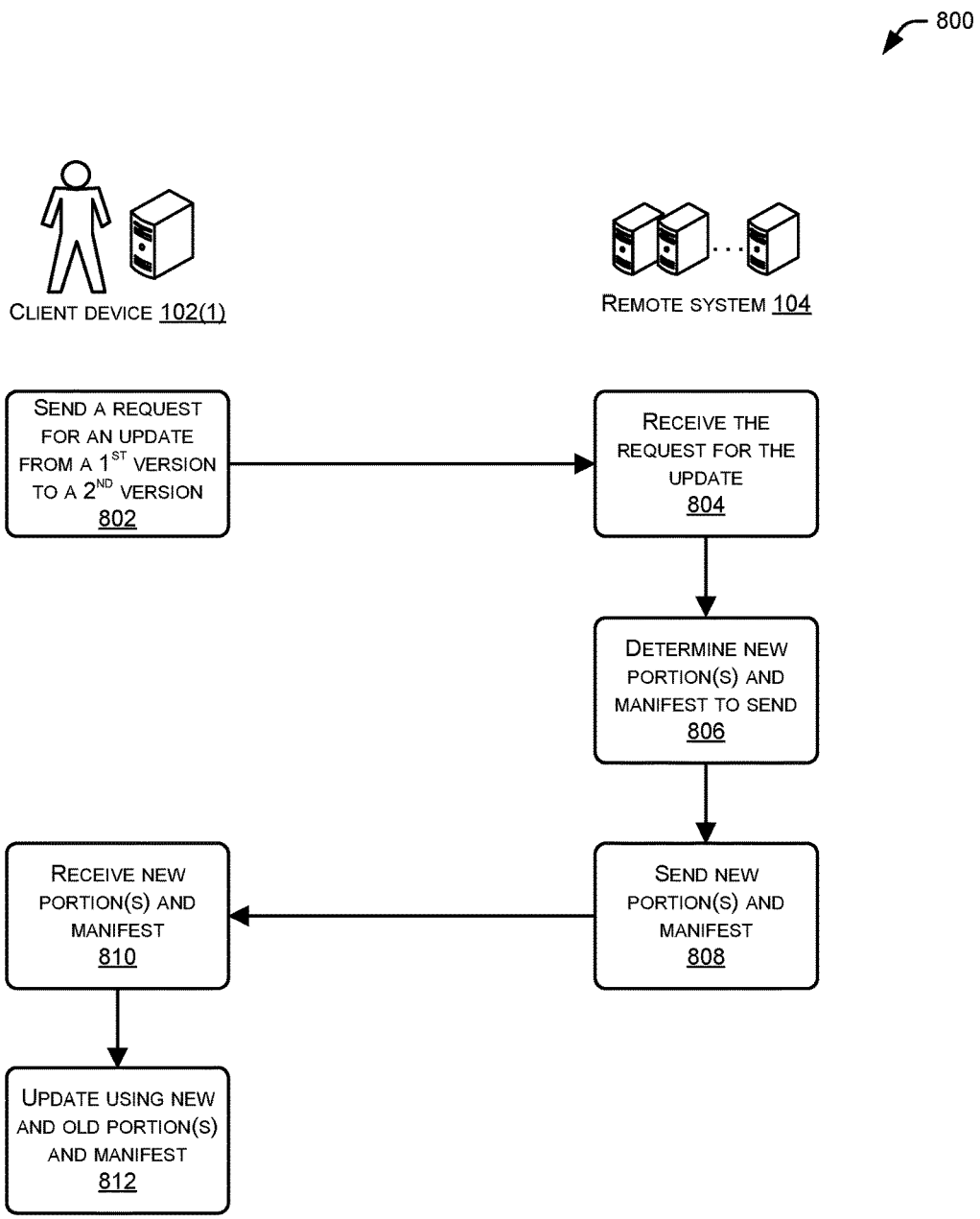
FIG. 8 illustrates a flow diagram of an example process that includes a client computing device sending a request for an updated version of an application. The figure also illustrates a remote system receiving the request and sending, to the client computing device, new portions of a new version of the application and a manifest for enabling the client computing device to recompile the new version using the new portions of the new version and the previous version of the application already executing on the client computing device.

FIG. 8 illustrates a flow diagram of an example process 800 that includes the client computing device 102(1) sending a request for an updated version of an application. The figure also illustrates the remote system 104 receiving the request and sending, to the client computing device, new portions of a new version of the application and a manifest for enabling the client computing device to recompile the new version using the new portions of the new version and the previous version of the application already executing on the client computing device.

At an operation 802, the client computing device 102(1) sends a request for update from a first version of an application to a second version of the application. The client computing device 102(1) may send this in response to a request from a user or based on any other trigger. In some instances, the request is accompanied by information used by the remote system for determining the current version being executed by the client computing device and/or the desired version of the application.

At an operation 804, the remote system receives the request for the update and, at an operation 806, determines one or more portions and the appropriate manifest to send to the client computing device 102(1). For example, the remote system may determine which portions are new to the second version relative to the new version and may retrieve these new portions and the appropriate manifest for updating from the first version to the second version using the new portions and the first version of the application. As described above, the manifest may comprise operations to update from the first version to the second version or, in other instances, may simply comprise recompilation instructions for the second version (without regard to which version the client computing device currently operates). Further, in some instances, sending the new portions may comprise sending information (e.g., URL(s)) for enabling the client computing device to retrieve the new portions.

At an operation 808, the remote system 104 sends the new portions and the manifest (e.g., as update data, such as update data 302) to the client computing device 102(1). The client computing device 102(1) receives the new portions and the manifest at an operation 810 and, at an operation 812, may update the application from the first version to the second version using the received data. As the reader will appreciate the time associated with the process 800 from the beginning of the update request to the successful update of the application may be significantly less than if the remote system were to send the entire second version, and the client computing device were to install the entire second version, in response to the initial update request.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    determining that a first portion of a first version of a file comprises a first byte-offset value that points to a location in the first version of the file;
    defining a second portion of the first version of the file that includes the first portion and at least one byte prior to the first portion and at least one byte after the first portion;
    determining that a third portion of the first version of the file, subsequent to the second portion, does not comprise a byte-offset value that points to a location in the first version of the file;
    determining that the third portion is greater than a threshold size;
    generating, at least partly in response to determining that the third portion is greater than the threshold size, first data that identifies a fourth portion of the first version of the file that is prior to the third portion, the fourth portion including at least the second portion;
    determining that a fifth portion of the first version of the file, subsequent to the third portion, comprises a second byte-offset value that points to a location in the first version of the file;
    defining a sixth portion of the first version of the file that includes the fifth portion and at least one byte prior to the fifth portion and at least one byte after the fifth portion; and
    generating second data that identifies a seventh portion of the first version of the file, the seventh portion residing between the fourth portion and the sixth portion.

2. The method as recited in claim 1, further comprising:
    comparing the second data to third data representing a first portion of a second version of the file;
    determining that the second data corresponds to the third data; and
    determining that the seventh portion corresponds to the first portion of the second version of the file.

3. The method as recited in claim 2, further comprising storing, in a manifest associated with the first version of the file, an indication that an offset value associated with a beginning of the seventh portion corresponds to the third data associated with the first portion of the second version of the file.

4. The method as recited in claim 1, further comprising:
    comparing the first data to third data representing a first portion of a second version of the file;
    determining that the first data corresponds to the third data; and
    determining that the fourth portion corresponds to the first portion of the second version of the file.

5. A system comprising:
    one or more processors; and
    one or more computer-readable media storing computer-executable instructions that, when executed, cause the one or more processors to perform acts comprising:
        determining that a first portion of a first version of a file meets one or more criteria;

defining a second portion of the first version of the file that is subsequent to the first portion and includes the first portion and at least one byte prior to the first portion and at least one byte after the first portion;

determining that a third portion of the first version of the file that is subsequent to the second portion does not meet the one or more criteria;

determining that the third portion is greater than a threshold size;

generating first data that identifies a fourth portion of the first version of the file that is prior to the third portion, the fourth portion including at least the second portion;

determining that a fifth portion of the first version of the file that is subsequent to the third portion meets the one or more criteria;

defining a sixth portion of the first version of the file that includes the fifth portion and at least one byte prior to the fifth portion and at least one byte after the fifth portion; and generating second data that identifies a seventh portion, the seventh portion residing between the fourth portion and the sixth portion.

6. The system as recited in claim 5, wherein the determining that the first portion of the first version of the file meets the one or more criteria comprises determining that the first portion of the first version of the file comprises a byte-offset value that points to a location in the first version of the file.

7. The system as recited in claim 5, wherein the determining that the first portion of the first version of the file meets the one or more criteria comprises determining that the first portion of the first version of the file corresponds to a number that is less than a threshold number.

8. The system as recited in claim 5, wherein the determining that the first portion of the first version of the file meets the one or more criteria comprises determining that the first portion of the first version of the file corresponds to a number that is less than a first threshold number and greater than a second threshold number.

9. The system as recited in claim 5, wherein the one or more computer-readable media further store computer-executable instructions that, when executed, cause the one or more processors to perform an act comprising:
comparing the second data to third data that identifies a first portion of a second version of the file.

10. The system as recited in claim 5, wherein the one or more computer-readable media further store computer-executable instructions that, when executed, cause the one or more processors to perform acts comprising:
comparing the second data to third data that identifies a first portion of a second version of the file;
determining, based at least in part on the comparing, that the seventh portion corresponds to the first portion of the second version of the file; and
storing, in a manifest associated with the first version of the file, an indication that an offset value associated with a beginning of the seventh portion corresponds to the third data associated with the first portion of the second version of the file.

11. The system as recited in claim 5, wherein the generating the second data comprises generating a check value using the third portion and generating a hash value using the third portion.

12. The system as recited in claim 5, wherein the one or more computer-readable media further store computer-executable instructions that, when executed, cause the one or more processors to perform acts comprising:
generating, prior to the determining that the first portion of the first version of the file meets the one or more criteria, third data associated with a eighth portion of the first version of the file;
comparing the third data to respective data associated with the respective portions of the second version of the file; and
determining that the third data does not correspond to the respective data; and
wherein the determining that the first portion of the first version of the file meets the one or more criteria comprises determining that the first portion of the first version of the file meets the one or more criteria at least partly in response to the determining that the third data does not correspond to the respective data.

13. A method comprising:
determining that a first portion of a first version of a file meets one or more criteria;
defining a second portion of the first version of the file that is subsequent to the first portion and includes the first portion and at least one byte prior to the first portion and at least one byte after the first portion;
determining that a third portion of the first version of the file that is subsequent to the second portion does not meet the one or more criteria;
determining that the third portion is greater than a threshold size;
generating first data that identifies a fourth portion of the first version of the file that is prior to the third portion, the fourth portion including at least the second portion;
determining that a fifth portion of the first version of the file that is subsequent to the third portion meets the one or more criteria;
defining a sixth portion of the first version of the file that includes the fifth portion and at least one byte prior to the fifth portion and at least one byte after the fifth portion; and
generating second data that identifies a seventh portion, the seventh portion residing between the fourth portion and the sixth portion.

14. The method as recited in claim 13, wherein the determining that the first portion of the first version of the file meets the one or more criteria comprises determining that the first portion of the first version of the file comprises a byte-offset value that points to a location in the first version of the file.

15. The method as recited in claim 13, wherein the determining that the first portion of the first version of the file meets the one or more criteria comprises determining that the first portion of the first version of the file corresponds to a number that is less than a threshold number.

16. The method as recited in claim 13, wherein the determining that the first portion of the first version of the file meets the one or more criteria comprises determining that the first portion of the first version of the file corresponds to a number that is less than a first threshold number and greater than a second threshold number.

17. The method as recited in claim 13, further comprising:
comparing the second data to third data that identifies a first portion of a second version of the file.

18. The method as recited in claim 13, further comprising:
comparing the second data to third data that identifies a first portion of a second version of the file;

determining, based at least in part on the comparing, that the seventh portion corresponds to the first portion of the second version of the file; and storing, in a manifest associated with the first version of the file, an indication that an offset value associated with a beginning of the seventh portion corresponds to the third data associated with the first portion of the second version of the file.

19. The method as recited in claim 13, further comprising:

generating, prior to the determining that the first portion of the first version of the file meets the one or more criteria, third data associated with a eighth portion of the first version of the file;

comparing the third data to respective data associated with the respective portions of the second version of the file; and determining that the third data does not correspond to the respective data; and wherein the determining that the first portion of the first version of the file meets the one or more criteria comprises determining that the first portion of the first version of the file meets the one or more criteria at least partly in response to the determining that the third data does not correspond to the respective data.

\* \* \* \* \*